(12) United States Patent
Tanaka et al.

(10) Patent No.: US 7,648,600 B2
(45) Date of Patent: Jan. 19, 2010

(54) HEAT TREATING DEVICE AND HEAT TREATING METHOD

(75) Inventors: Yoshimasa Tanaka, Hiratsuka (JP); Hisaki Koga, Kariya (JP); Kazuhiro Kawasaki, Hiratsuka (JP)

(73) Assignee: Neturen Co., Ltd., Tokyo (JP)

( * ) Notice: Subject to any disclaimer, the term of this patent is extended or adjusted under 35 U.S.C. 154(b) by 0 days.

(21) Appl. No.: 12/362,418

(22) Filed: Jan. 29, 2009

(65) Prior Publication Data

US 2009/0159157 A1 Jun. 25, 2009

Related U.S. Application Data

(62) Division of application No. 10/569,001, filed as application No. PCT/JP03/14969 on Nov. 25, 2003.

(30) Foreign Application Priority Data

Aug. 19, 2003 (JP) ............................... 2003-295352

(51) Int. Cl.
*H05B 6/10* (2006.01)

(52) U.S. Cl. ...................................... 148/575; 148/567

(58) Field of Classification Search ................. 148/567, 148/570, 572, 575
See application file for complete search history.

(56) References Cited

U.S. PATENT DOCUMENTS

| 3,800,115 | A | 3/1974 | Cachat |
| 3,988,179 | A | 10/1976 | Del Paggio et al. |
| 4,184,798 | A | 1/1980 | Laughlin |
| 7,253,381 | B2* | 8/2007 | Loveless et al. ............. 219/661 |
| 2003/0160045 | A1* | 8/2003 | Eberhardt et al. ........... 219/634 |

FOREIGN PATENT DOCUMENTS

| JP | 58107481 A | 6/1983 |
| JP | 6-49530 | 2/1994 |
| JP | 4-198415 | 7/1997 |

* cited by examiner

*Primary Examiner*—Scott Kastler
(74) *Attorney, Agent, or Firm*—patenttm.us

(57) ABSTRACT

A heat treatment apparatus 10 comprises a supporting unit 20 for supporting a columnar workpiece 12 turnably, and an induction-heating coil 30 for induction-heating the workpiece 12 supported turnably by the supporting unit 20. Below the workpiece 12 supported by the supporting unit 20, a cooling tank 50 is provided which contains a liquid coolant. The workpiece 12 is made of steel such as carbon steel for mechanical structure, and spring steel. The workpiece 12 is made of a material which has a magnetic transformation point at 770° C. The material is ferromagnetic below this temperature, and becomes paramagnetic above this temperature.

7 Claims, 27 Drawing Sheets

Fig.5
(a)
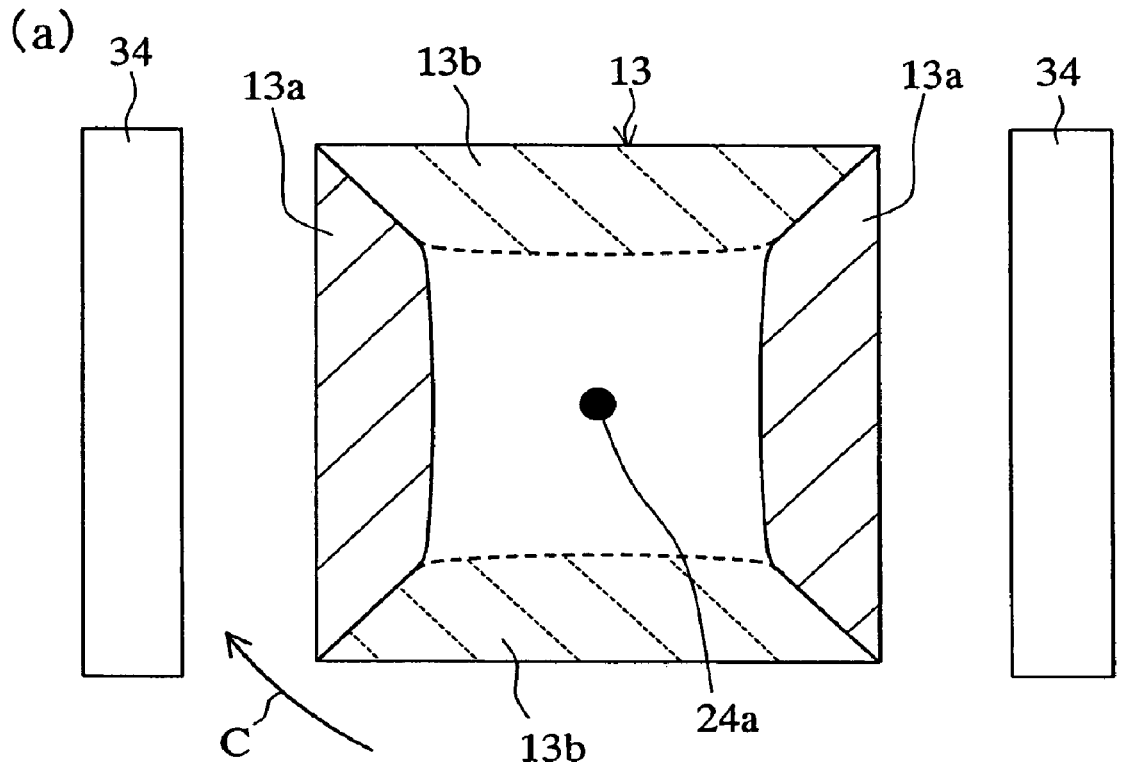
(b)
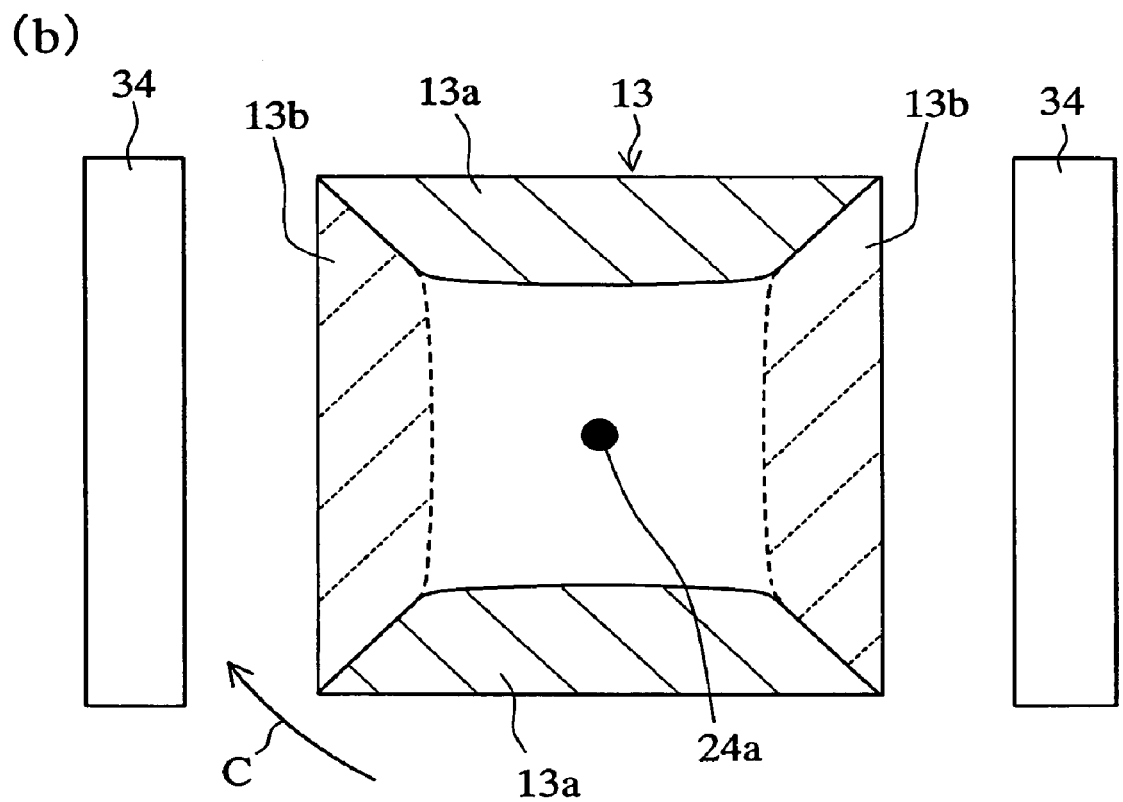

Fig.6
(a) 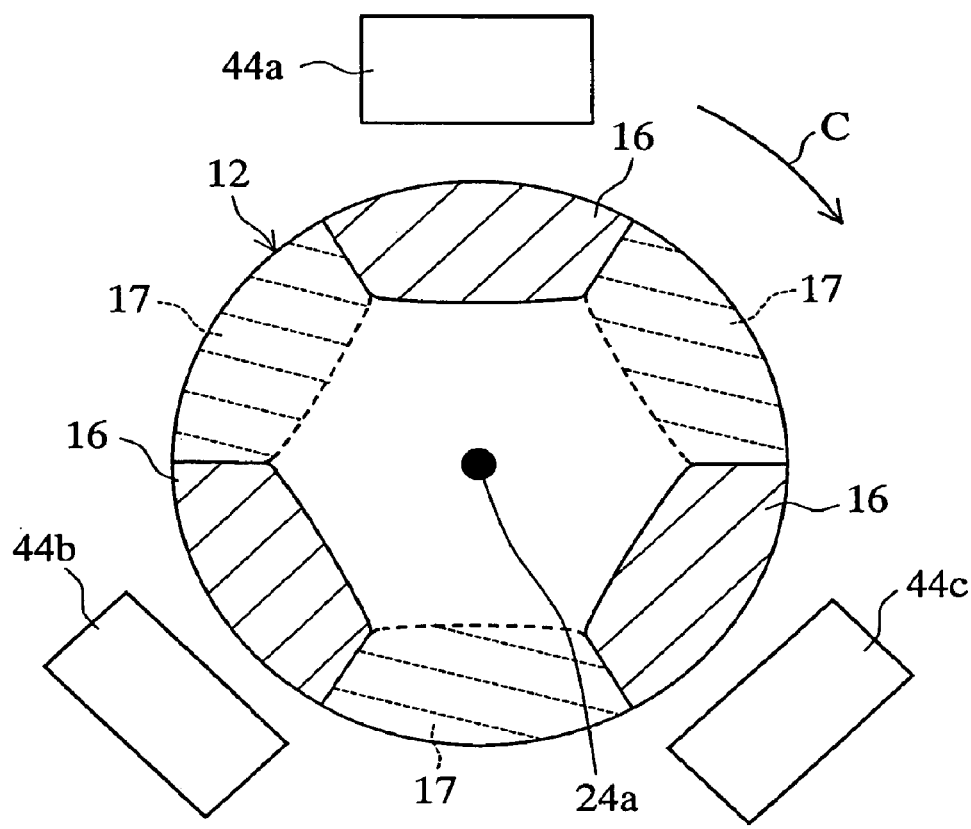
(b) 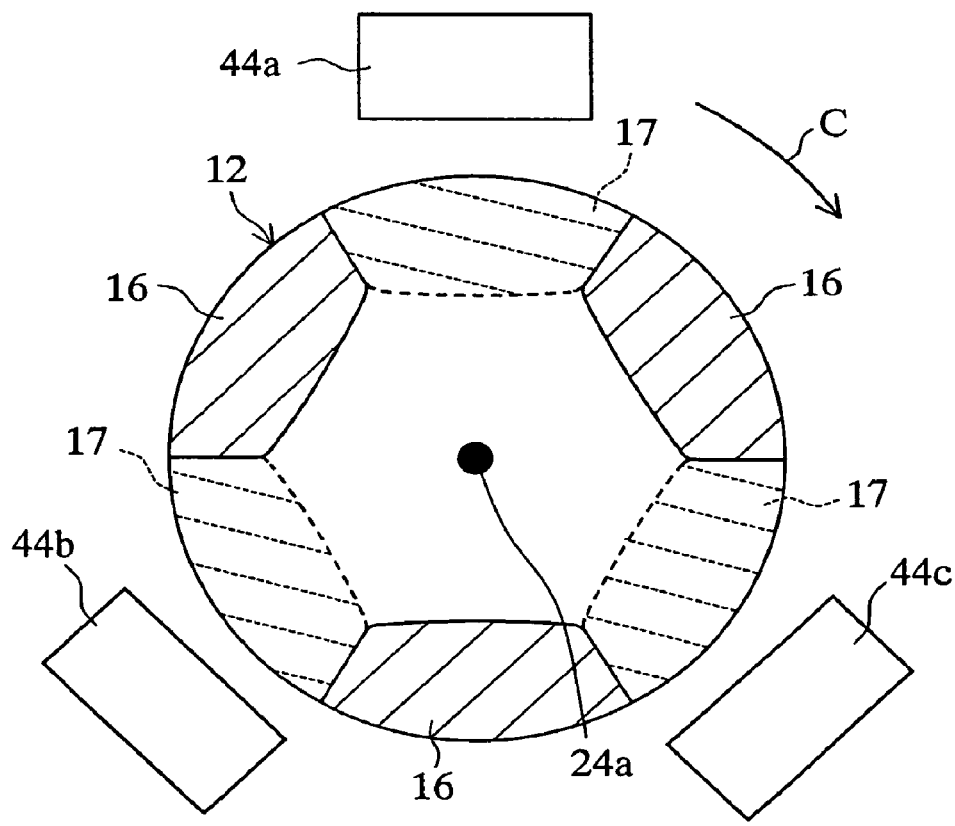

Fig.7
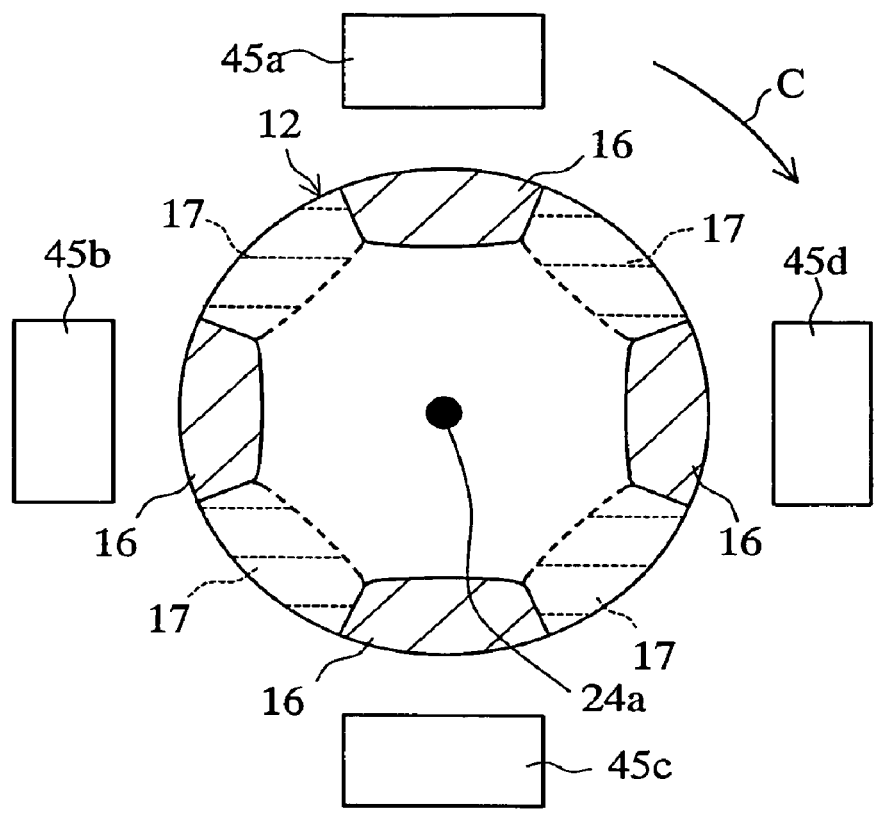
(a)
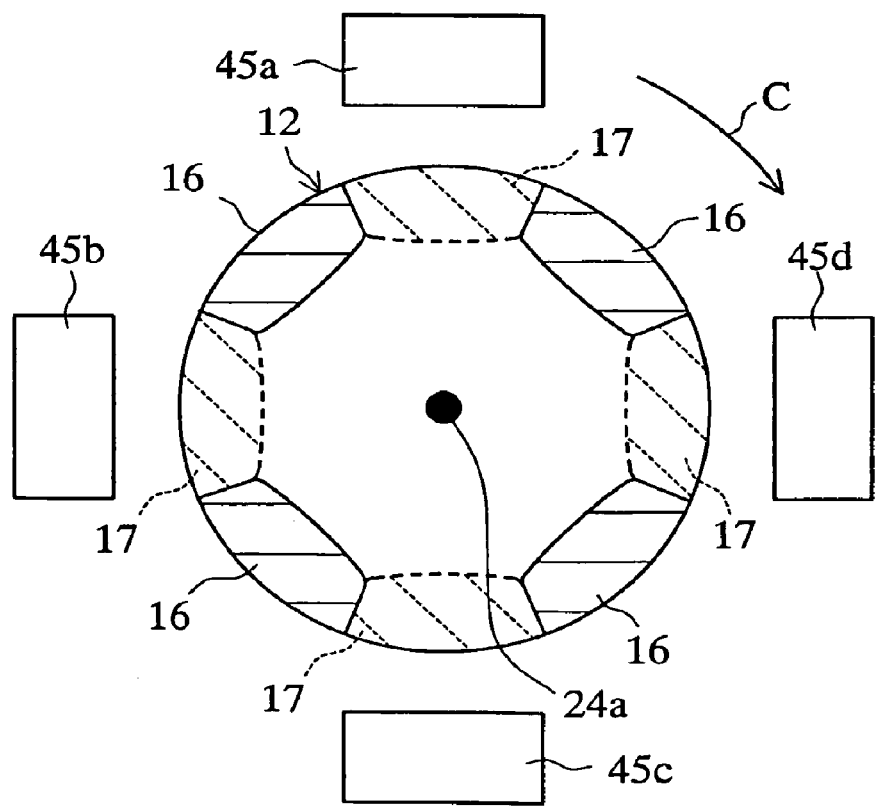
(b)

Fig.11
(a)
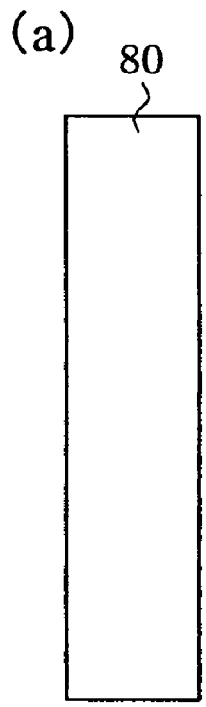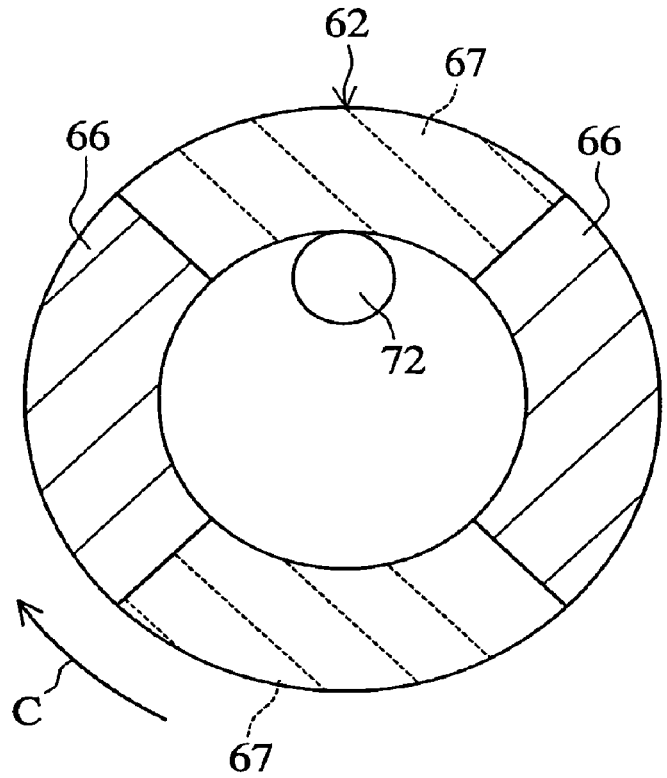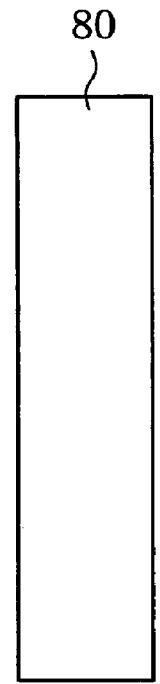
(b)
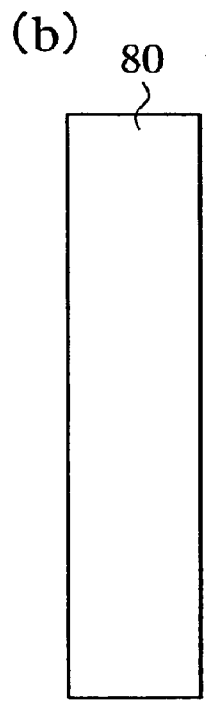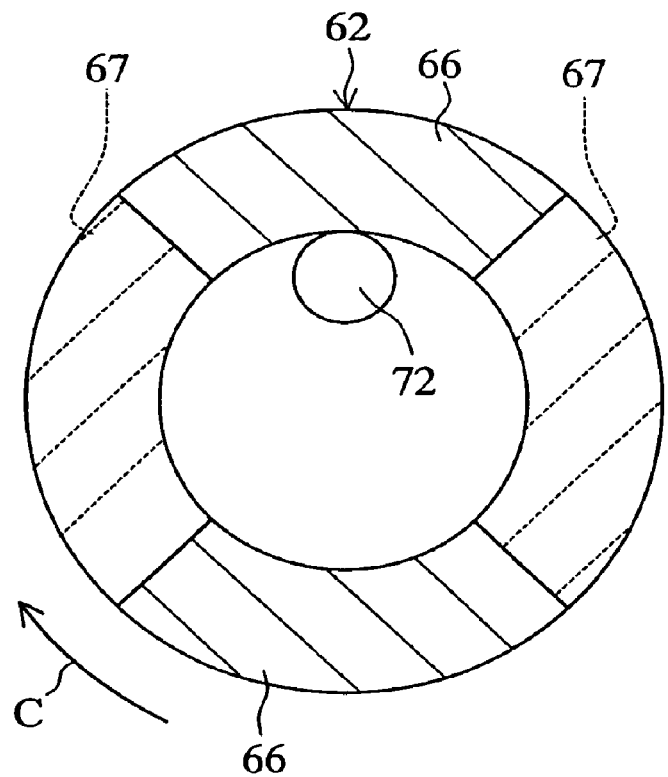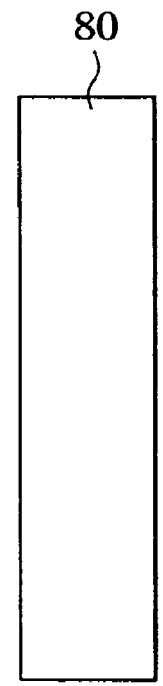

Fig.12
(a)
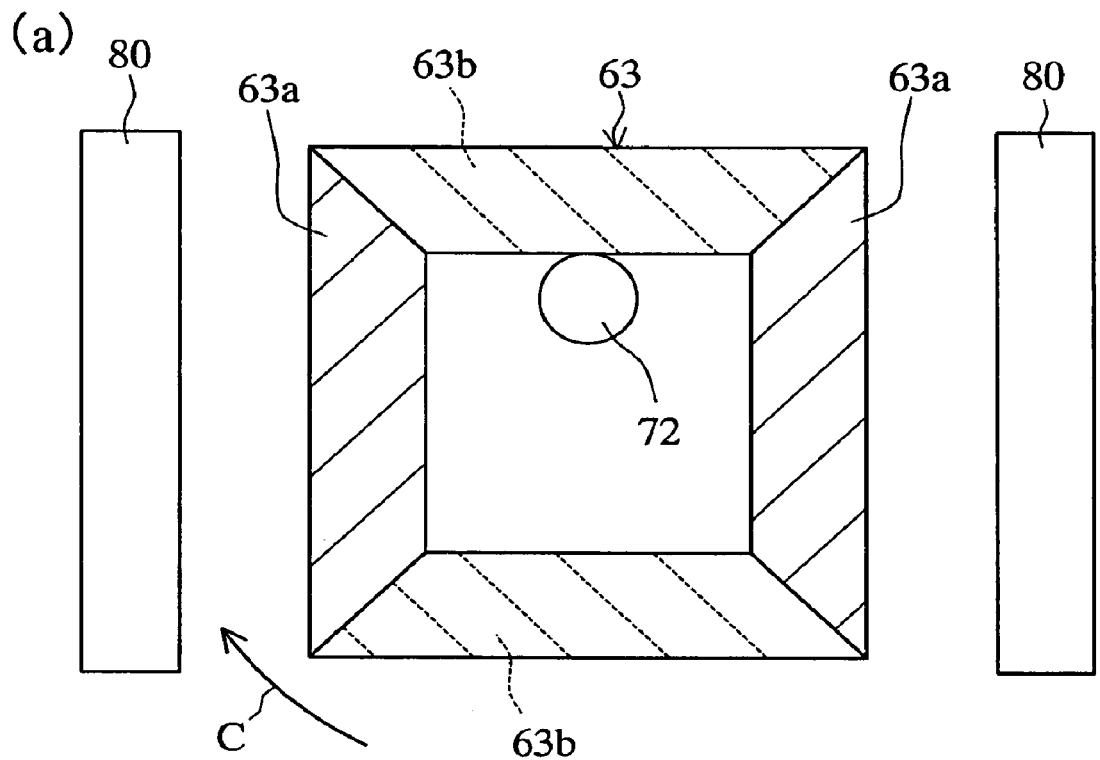
(b)
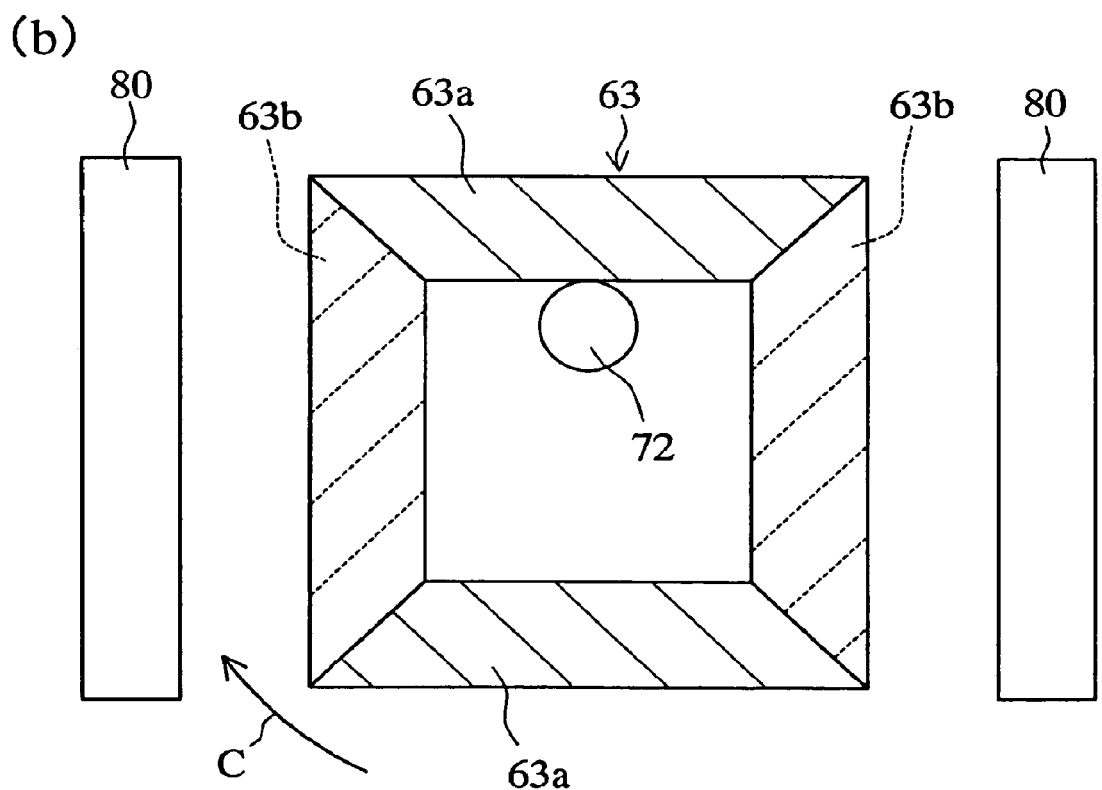

Fig.13
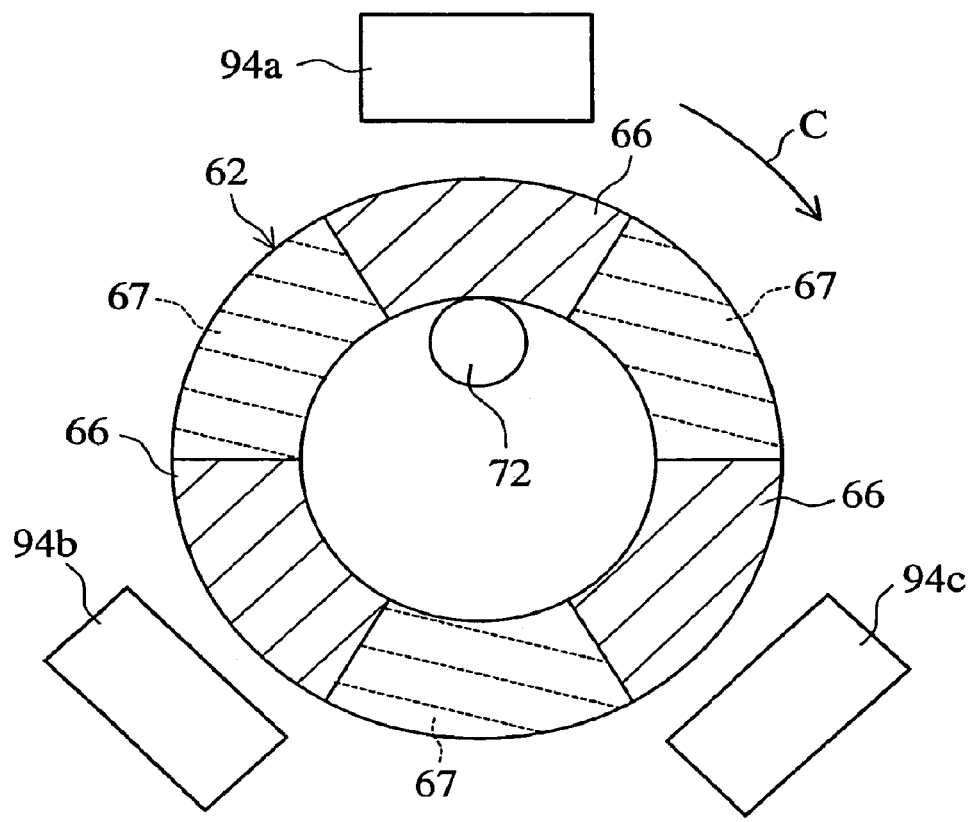
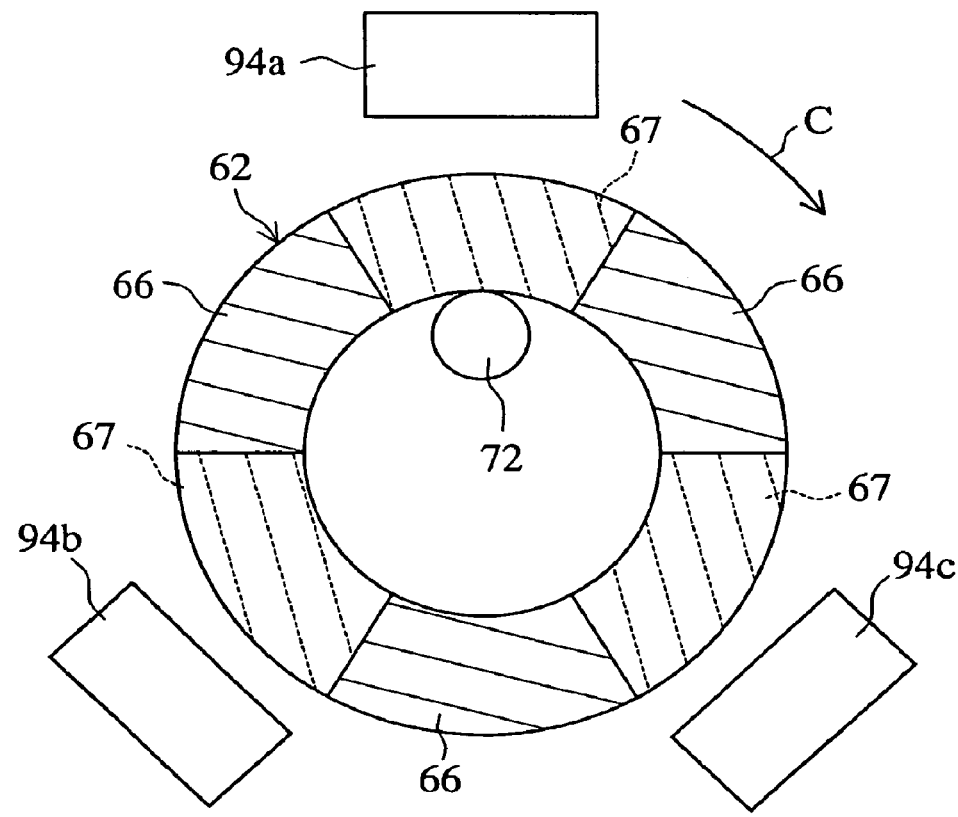

Fig.14
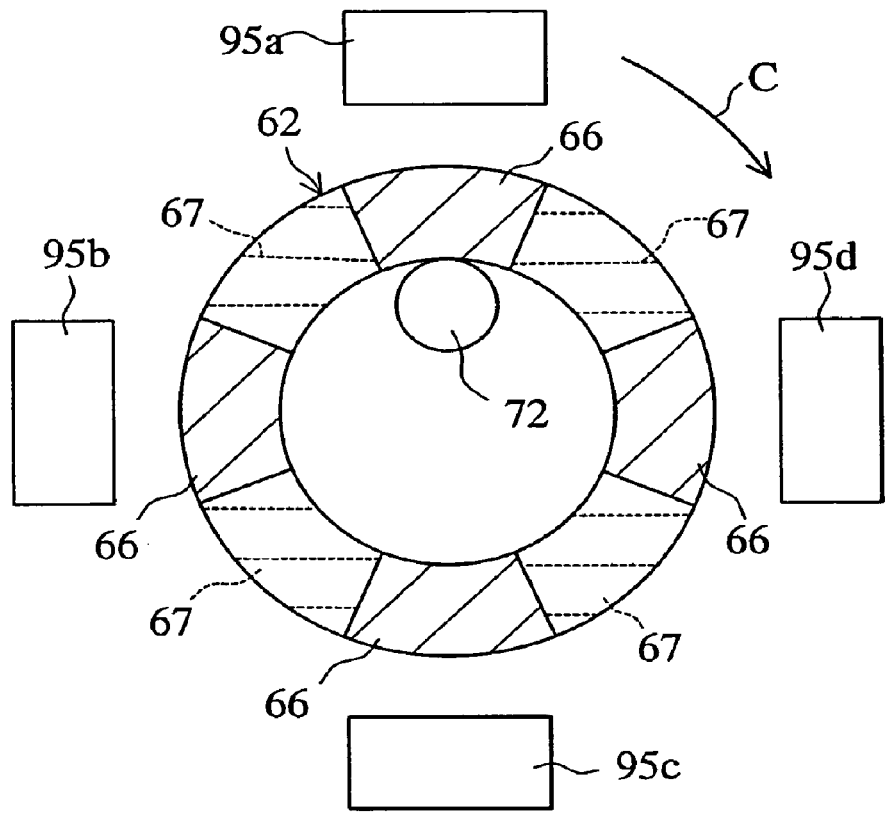
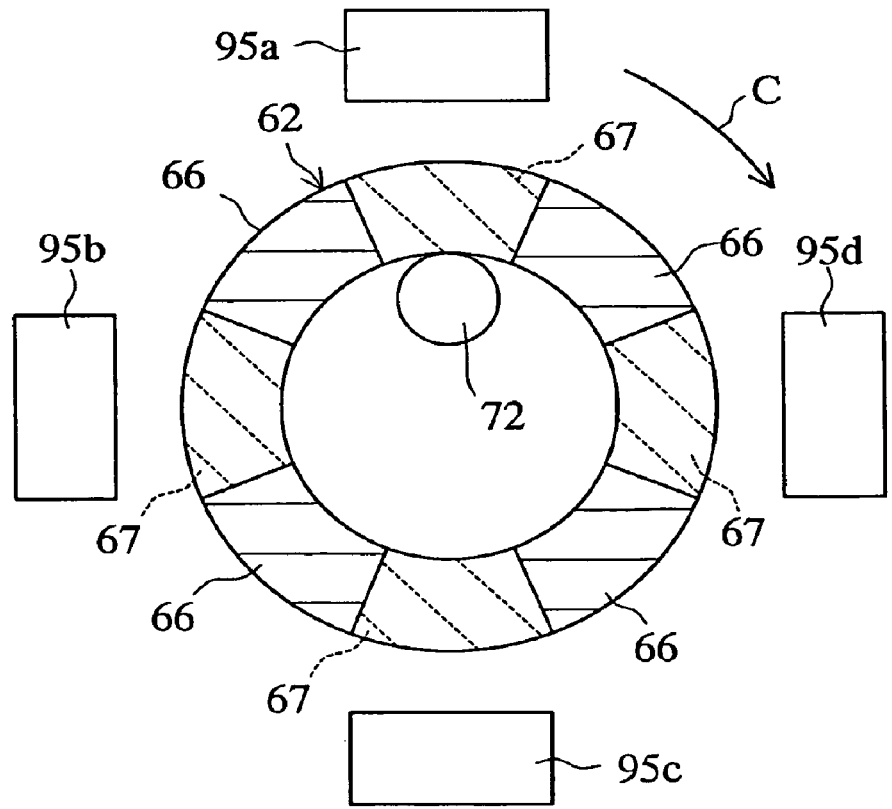

Fig.17
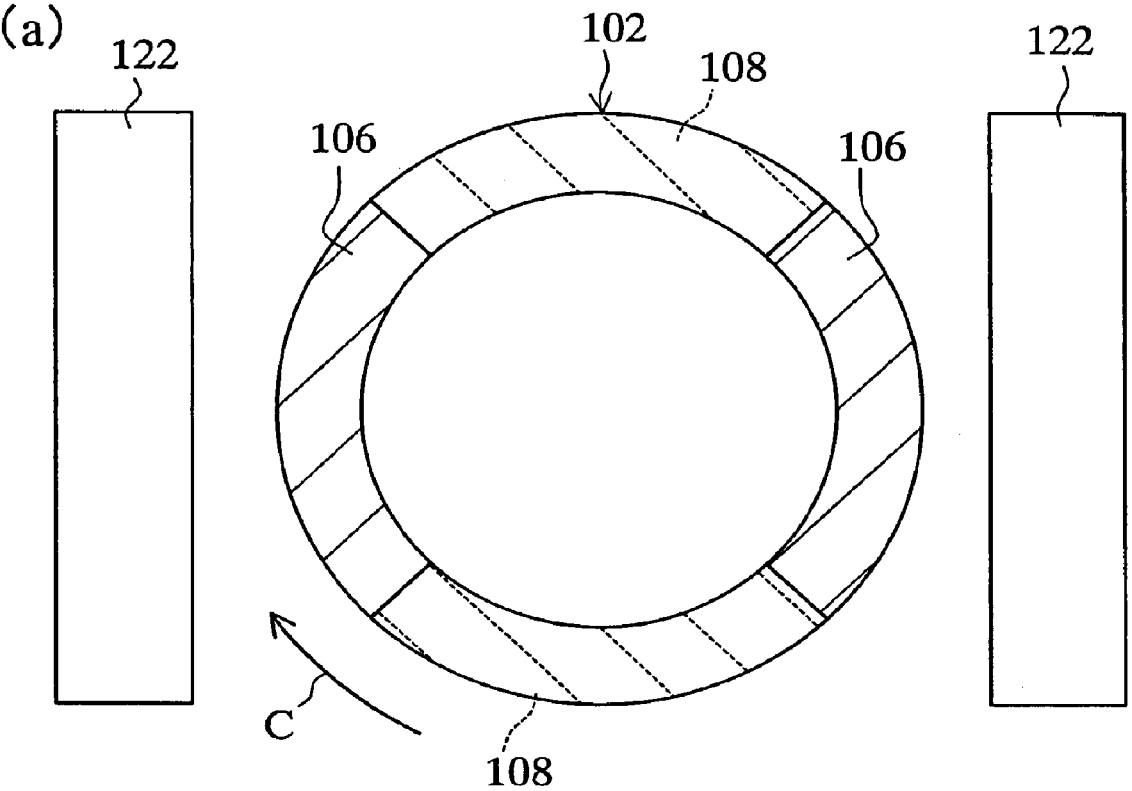
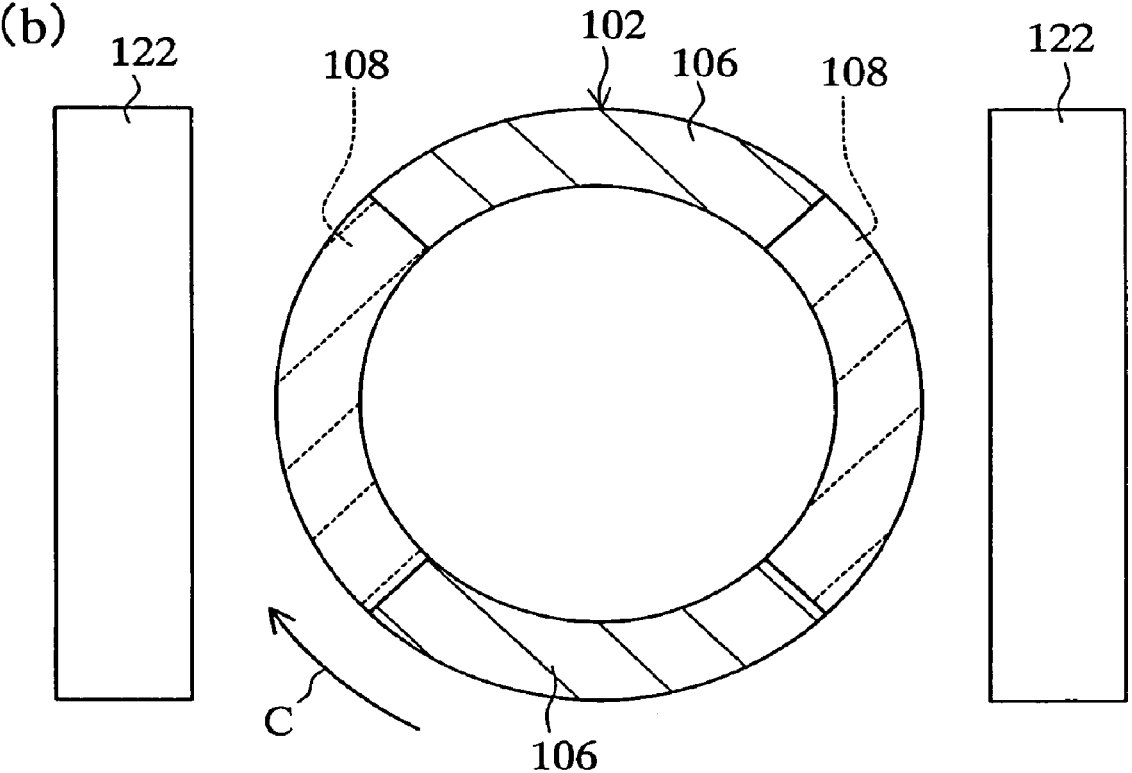

Fig.20
(a)
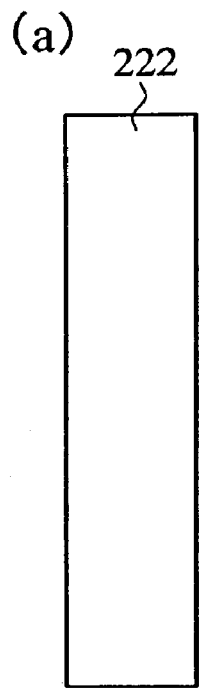
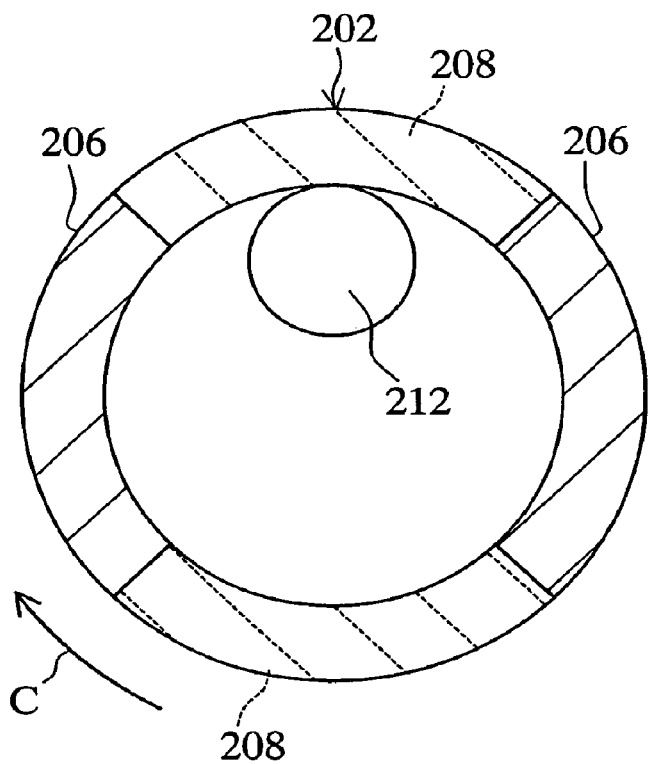
(b)
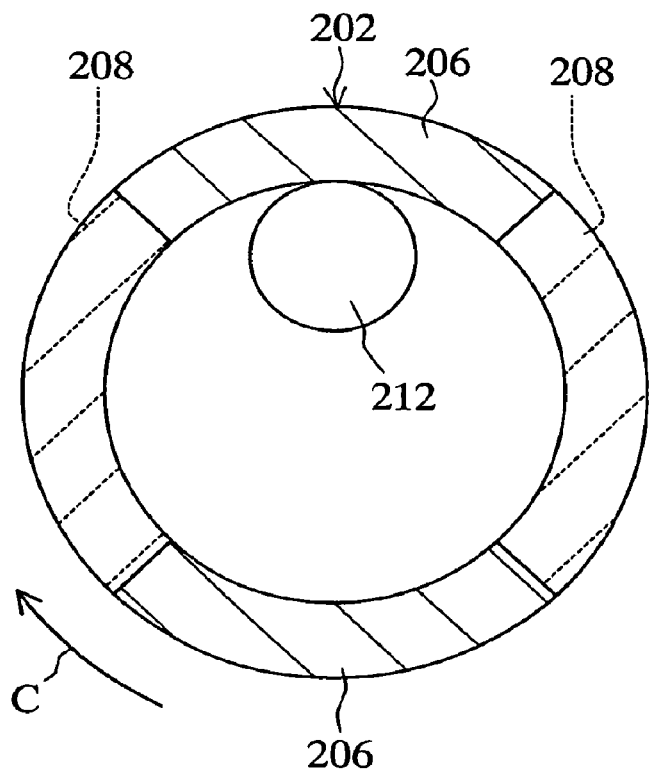

Fig.23
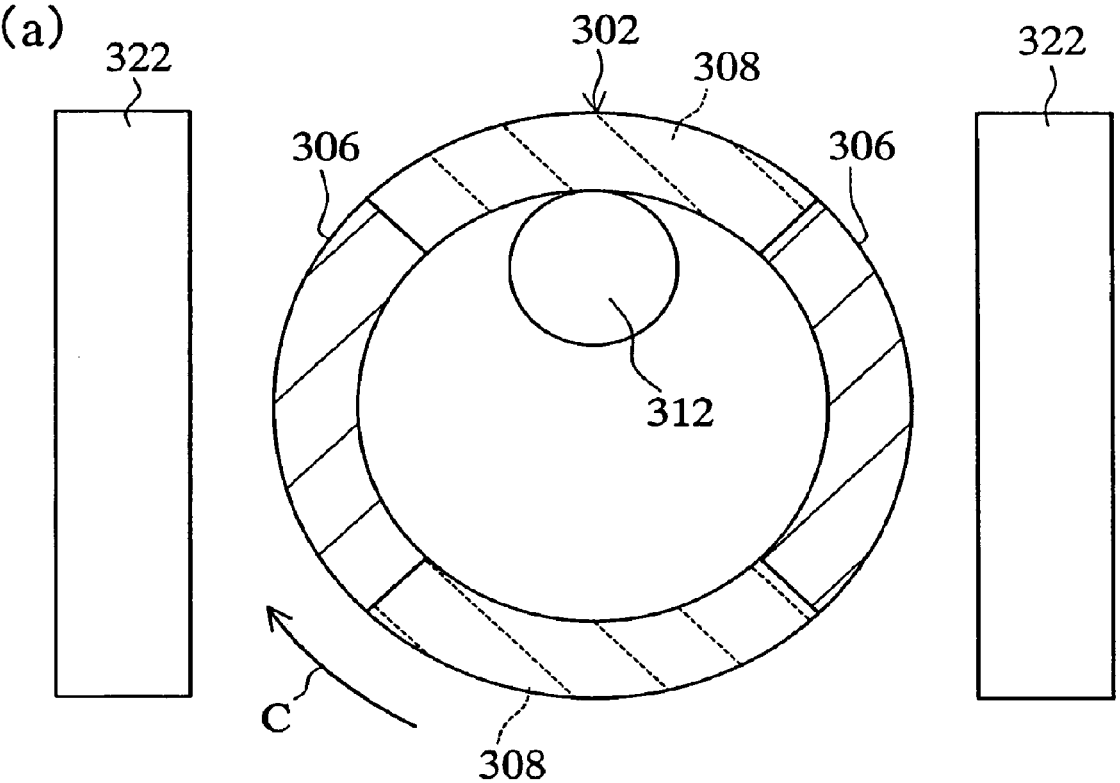
(a)
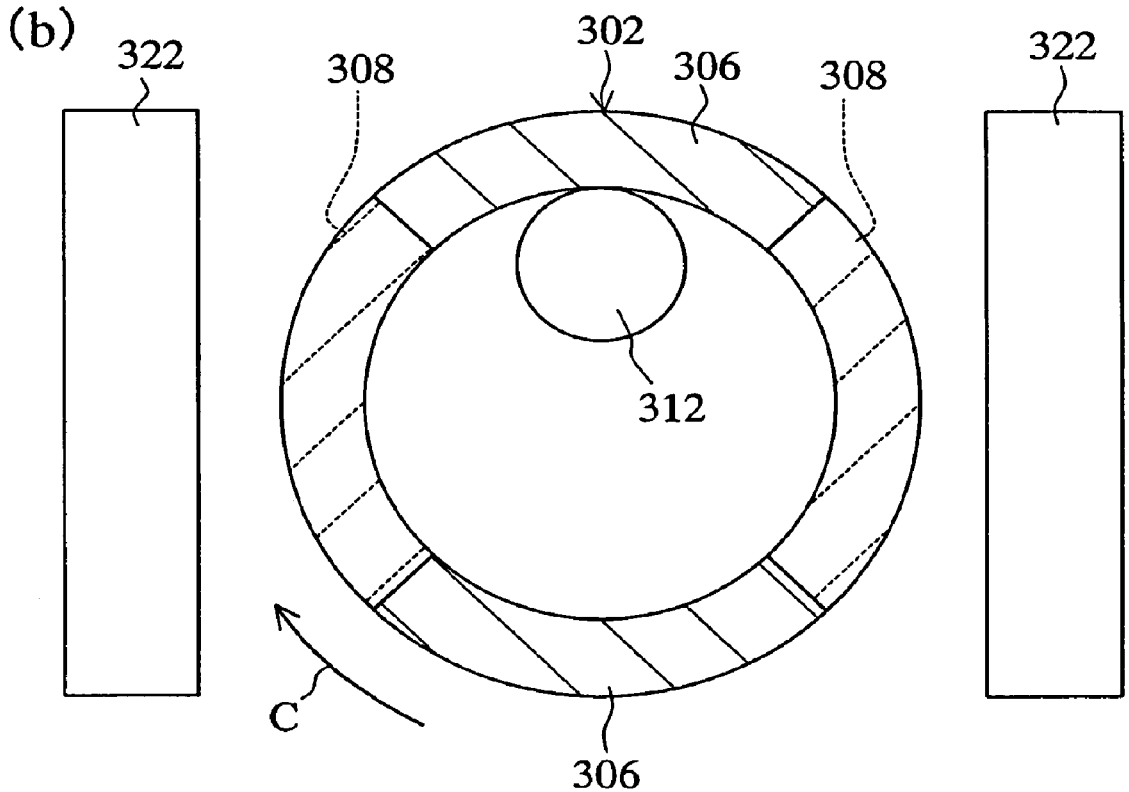
(b)

Fig.26
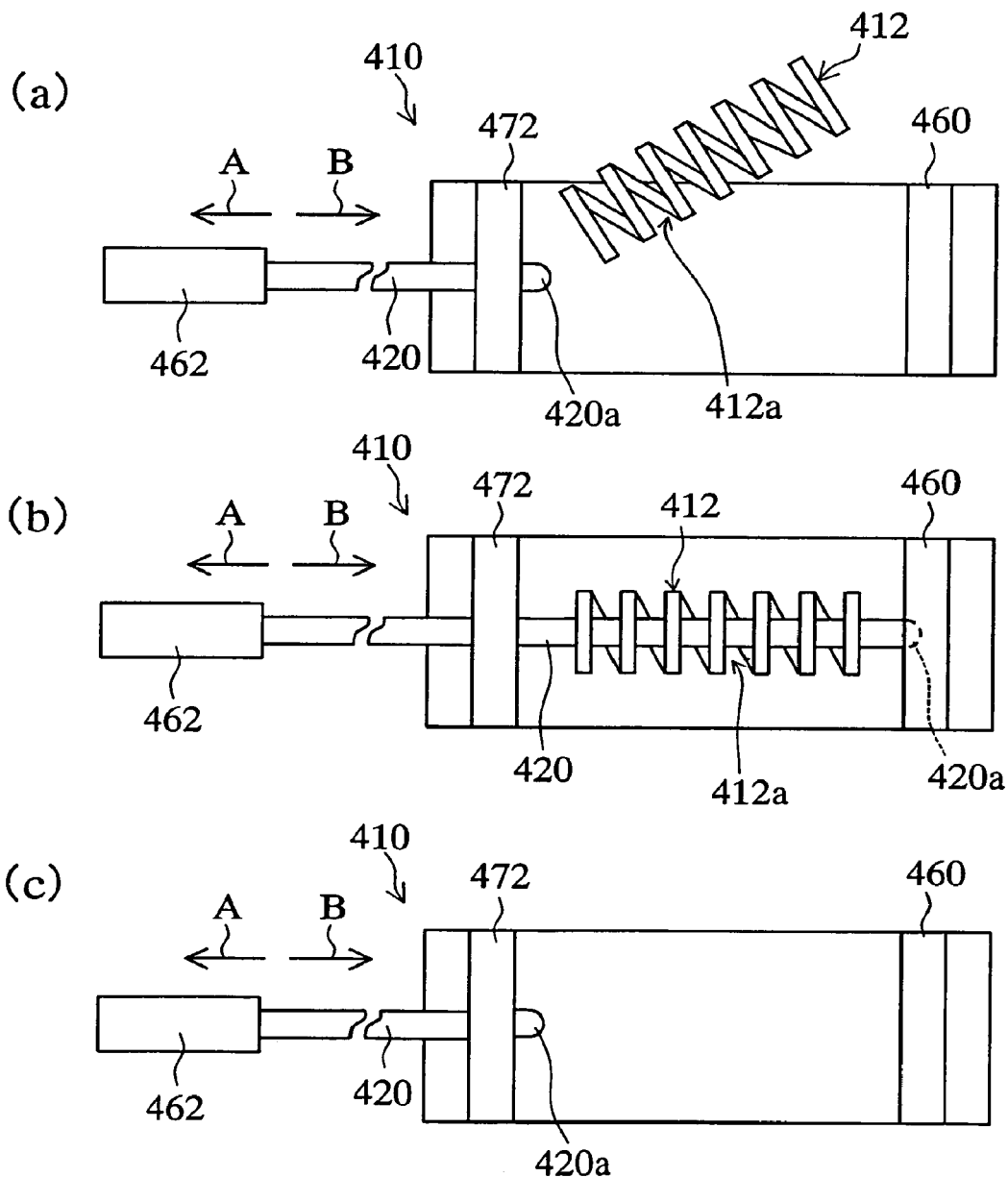
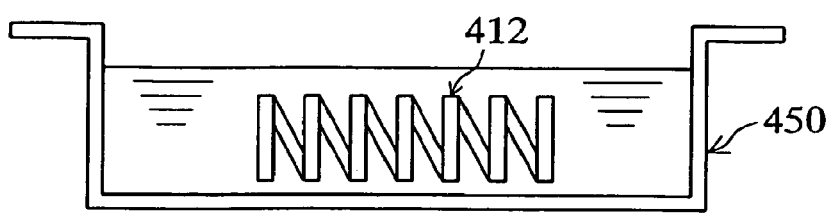

Fig.27
(a) 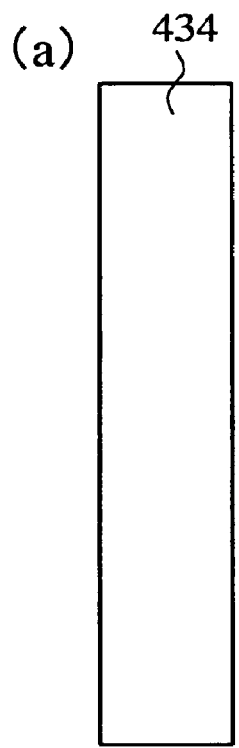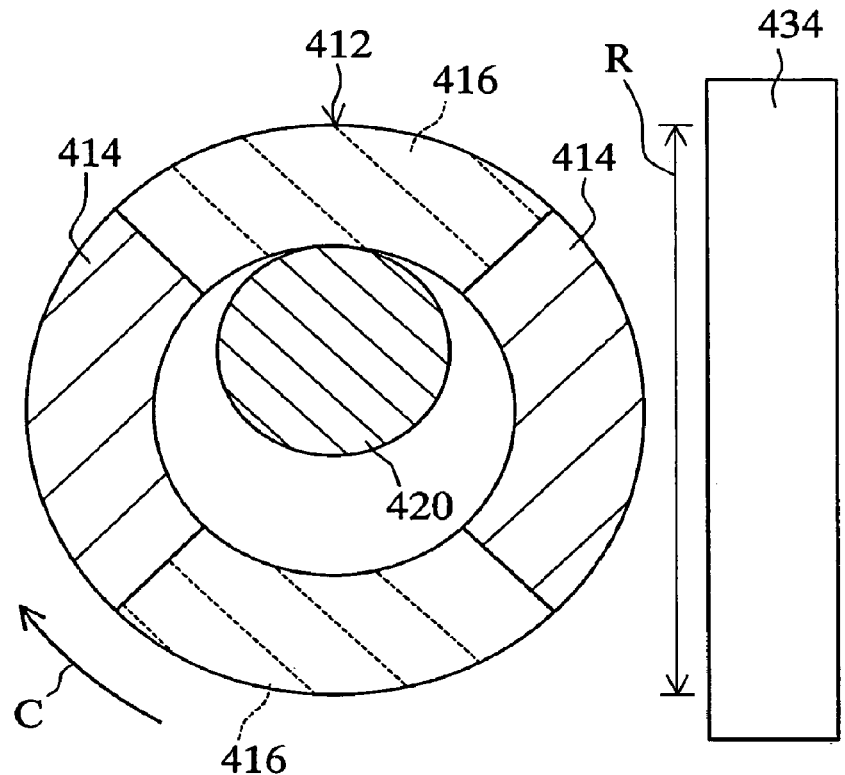
(b) 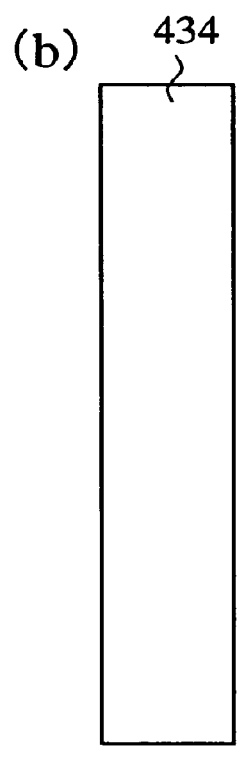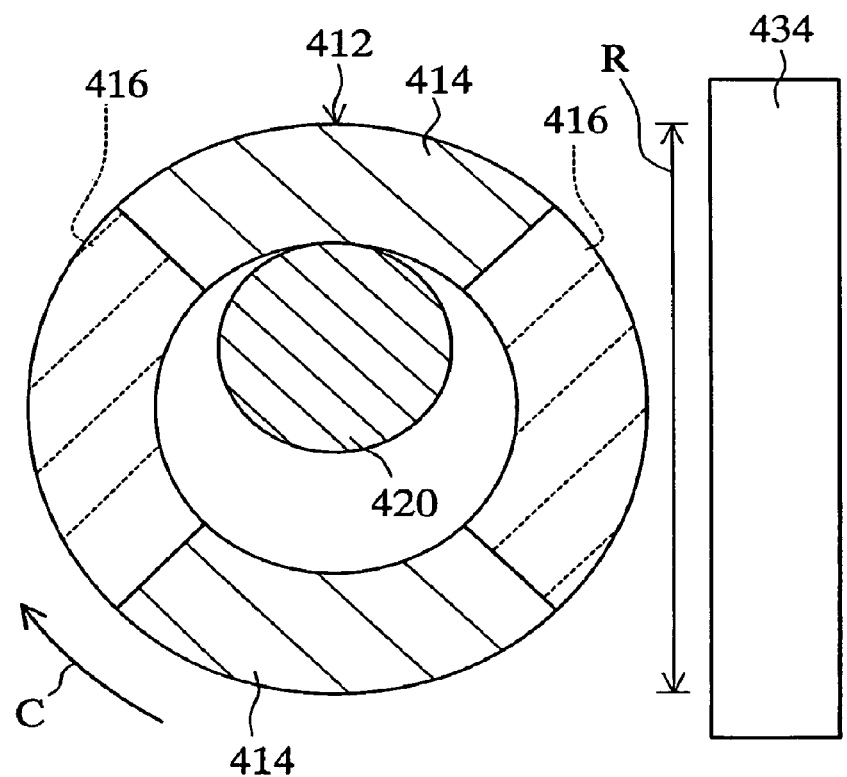

HEAT TREATING DEVICE AND HEAT TREATING METHOD

This application is a divisional of U.S. patent application Ser. No. 10/569,001 filed Feb. 17, 2006 (currently pending).

TECHNICAL FIELD

The present invention relates to a heat treatment apparatus utilizing an induction-heating system, and a heat treatment method employing the apparatus.

TECHNICAL BACKGROUND

Various heat treatment methods are known for heat-treatment of steel by induction heating. In one of the known heat treatment methods, an induction-heating coil is placed near a portion of a workpiece to heat the portion, then the workpiece is turned for heating the other portions, and thus the entire of the workpiece is induction-heated up to a prescribed temperature. For turning the workpiece, a driving power source like a motor is necessary for turning a workpiece-supporting member.

DISCLOSURE OF THE INVENTION

In the above method, a portion of the workpiece is partly induction-heated to a prescribed temperature, and the workpiece is turned to heat the rest of the portions of the workpiece by induction heating, whereby the entire of the workpiece is uniformly heated. The turning of the workpiece should be started immediately after the portion of the workpiece has been heated up to the prescribed temperature. However, the timing of the start of the turning can deviate owing to a mechanical or electrical error of the driving mechanism. The start of the turning of the workpiece earlier or later than the prescribed timing prevents uniform induction heating of the entire workpiece.

In view of the above circumstance, a first object of the present invention is to provide a heat treatment apparatus and a heat treatment method for induction-heating uniformly a workpiece such as a helix member and a coil spring by turning the workpiece.

An example of the heat treatment utilizing the aforementioned induction heating is quench-hardening (hereinafter occasionally referred simply as "hardening") of a coil spring such as a valve spring of an automobile engine. The valve spring serves to open and close precisely a valve by following the shape of the cam of the automobile engine. The valve spring is attached to an end of a valve rod by a valve spring bearing and a valve spring stopper. The coil spring includes suspension springs of front forks of bicycles and motorbikes, and coil springs of industrial machines.

In a known method for producing a coil spring like a valve spring, for example, a long material is hardened and tempered; this material is cut in a suitable length; and the cut material is wound in a coil shape. In this method, a material hardened by quench-hardening is cut and coiled: this cutting and coiling operation is not easy and the life of the cutting machine is short, disadvantageously.

To solve the above problem, in another known method for producing a coil spring, a long material before quenching-and-tempering is cut in a suitable length and wound in a coil to prepare a coil-shaped member of a prescribed length, and this coil member is hardened and tempered to produce a coil member. The hardening and tempering may be conducted by induction heating.

In the quench-hardening of a coil-shaped member by induction-heating, an induction-heating coil is provided which extends in a helix shape along the periphery of the coil-shaped member to heat the coil-shaped material by induction heating to the quench-hardening temperature. However, such a coil shaped member cannot readily be heated entirely uniformly by induction heating in a short time (e.g., in 5 seconds), so that the coil-shaped member is induction-heated for a longer time (e.g., tens of seconds).

The aforementioned coil-shaped members include open types which have both ends in the length direction to be free, and closed types which have both ends in the length direction to be in contact with the inner portion thereof.

When an open type of coil-shaped member is induction-heated for a long time, the center portion of the coil-shaped member (except the both end portions in the length direction) will not be overheated since the heat is conducted to neighboring portions, whereas at the end portions in the length direction of the coil-shaped member can be overheated since the heat is conducted only toward the center portion. In the overheated end portions in the length direction, the crystal grains can be coarsened or other problem may be caused. On the other hand, a closed type coil-shaped member is induction-heated for a long time, the both ends of the member in the length direction become overheated since short-circuit current flow is caused between the both ends of the member.

As described above, whether the coil-shaped member is of an open type or a closed type, the entire member cannot readily be heated entirely uniformly in a short time, or the both ends in the length direction of the member can be overheated by induction heating for long time. This causes irregularity of the metal structure of the coil spring and unevenness of the hardness to lower the quality.

In another method in which a long material, after hardening and tempering, is wound in a coil, the hardened material is cut or wound in a coil. This cutting and winding operation is difficult and shortens the life of the cutting machine, and increases the number of the operation steps, raising the production cost.

In view of the above problem, a second object of the present invention is to provide a method of heat treatment of a coil spring, and an apparatus of heat treatment of a coil spring.

A first heat treatment apparatus of the present invention for achieving the above first object comprises (1) a supporting means for supporting a workpiece turnably around a turning axis, and (2) a fixed induction-heating coil for induction-heating a belt zone, extending parallel to the turning axis, of the workpiece supported by the supporting means.

A second heat treatment apparatus of the present invention for achieving the above first object comprises (3) a supporting means for supporting a workpiece turnably around a turning axis, and (4) an induction-heating coil opposed to a belt zone, extending parallel to the turning axis, of the workpiece supported by the supporting means.

A third heat treatment apparatus of the present invention for achieving the above first object comprises (5) a supporting means for supporting a columnar workpiece to be turnable in a periphery direction around a turning axis extending in a length direction, and (6) an induction-heating coil opposed to a belt zone, extending parallel to the turning axis, of a peripheral face of the workpiece and of the workpiece supported by the supporting means.

A fourth heat treatment apparatus of the present invention for achieving the above first object comprises (7) a rod-shaped supporting means for supporting a tubular workpiece, inserted into a hollow of the workpiece, to be turnable in a periphery direction around a turning axis extending in a length direction, and (8) an induction-heating coil opposed to a belt zone of a peripheral face of the workpiece and extending parallel to the turning axis of the workpiece supported by the supporting means.

The tubular workpiece includes pipe-shaped workpieces.

(9) The supporting means may serve to support a workpiece which is ferromagnetic at a temperature below the magnetic transformation point thereof and becomes paramagnetic at a temperature above the magnetic transformation point.

(10) The supporting means may be movable from a position for supporting the workpiece to another position to release the workpiece to fall, and

(11) may be provided with a cooling tank containing a coolant below the workpiece supported by the supporting means.

(12) The induction-heating coil may be constituted of a pair of partial coils placed in opposition on both sides of the workpiece.

(13) The induction-heating coil may be in a rectangle shape, and

(14) the supporting means may be placed between a pair of long sides of the rectangle-shaped induction-heating coil, and may support the workpiece extending parallel to the pair of the long sides.

A fifth heat treatment apparatus of the present invention for achieving the above first object comprises

(15) a ceramic supporting rod inserted in a hollow of a helix member for supporting the helix member formed from a wire material which is transformed from ferromagnetic to paramagnetic by temperature elevation above the magnetic transformation point, to be turnable in the periphery direction of the helix member, and

(16) an induction-heating coil placed to face counterposed portions, on both sides of the supporting rod, of the peripheral face of the helix member supported by the supporting rod.

(17) The induction-heating coil may be constituted of a pair of partial coils placed in opposition on both sides of the helix member.

(18) The pair of the partial coils may extend along the peripheral face of the helix member in the length direction thereof, and

(19) the supporting rod may be placed between the pair of the partial coils, and may extend parallel to the pair of the partial coils.

(20) The supporting rod may be movable from a position for supporting the helix member to another position to release the helix member to fall, and

(21) a cooling tank containing a coolant may be provided below the helix member supported by the supporting rod.

A first heat treatment method of the present invention for achieving the above first object comprises

(22) supporting the workpiece turnably around a turning axis,

(23) induction-heating a belt zone, extending parallel to the turning axis, of the workpiece by bringing an induction-heating coil near to the belt zone, and

(24) allowing the workpiece to turn by a magnetic force, when the belt zone has been heated above a predetermined temperature, to bring another portion other than the belt zone near to the induction coil, and induction-heating the portion.

A second heat treatment method of the present invention for achieving the above first object comprises

(25) supporting a columnar workpiece turnably in a periphery direction,

(26) induction-heating a belt zone, extending in a height direction, of the columnar workpiece by bringing an induction-heating coil near to the belt zone, and

(27) allowing the columnar workpiece to turn by a magnetic force, when the belt zone has been heated above a predetermined temperature, to bring another portion other than the belt zone near to the induction coil, and induction-heating the portion.

A third heat treatment method of the present invention for achieving the above first object comprises

(28) supporting a tubular workpiece to be turnable in a periphery direction of the tubular workpiece by a rod-shaped supporting means inserted into a hollow of the workpiece,

(29) induction-heating a belt zone, extending parallel to the supporting means, of the peripheral face of the tubular workpiece by bringing an induction-heating coil near to the belt zone, and

(30) allowing the tubular workpiece to turn by a magnetic force, when the belt zone has been heated above a predetermined temperature, to bring a portion other than the belt zone near to the induction coil, and induction-heating the portion.

A fourth heat treatment method of the present invention for achieving the above first object comprises

(31) supporting the helix member turnably in a direction of the periphery thereof by a ceramic supporting rod inserted into a hollow of the helix member formed from a material which is transformed from ferromagnetic to paramagnetic by temperature elevation above the magnetic transformation point,

(32) induction-heating opposed portions of the peripheral face of the helix member, supported by the supporting rod on the both sides of the supporting rod, by bringing an induction-heating coil near to the opposed portions,

(33) allowing the helix member to turn by a magnetic force, when the belt zone has been heated above a predetermined temperature, to bring portions other than the opposed portions near to the induction coil, and induction-heating the portions.

(34) The helix member may be allowed to fall, when the helix member has heated up to a predetermined hardening temperature, into a cooling tank containing a coolant by pulling the supporting rod out of the hollow portion of the helix member.

The columnar workpiece in the present invention includes not only cylindrical columns but also prisms such as triangular prisms and hexagonal prisms.

The tubular workpiece in the present invention includes not only cylinders but also prisms such as triangular prisms and hexagonal prisms in appearance, having a through-hole extending in the length direction.

The helix member in the present invention includes not only those having an entire shape of a cylinder, but also those having an entire shape of a cone, a barrel, or a cylinder narrowed in the middle portion. Further, the helix member includes coil-shaped members.

A second heat treatment apparatus of the present invention for achieving the above second object comprises

(35) a ceramic supporting rod inserted in a hollow of a coil spring for supporting the coil spring formed from a wire material which is transformed from ferromagnetic to paramagnetic by temperature elevation above the magnetic transformation point to be turnable in the periphery direction of the coil spring, and

(36) an induction-heating coil placed to face counterposed portions, on both sides of the supporting rod, of the peripheral face of the coil spring supported by the supporting rod.

(37) The induction-heating coil may be constituted of a pair of partial coils placed in opposition on both sides of the coil spring.

(38) The pair of the partial coils may extend along the peripheral face of the coil spring in the length direction thereof, and

(39) the supporting rod may be placed between the pair of the partial coils, and may extend parallel to the pair of the partial coils.

(40) The supporting rod is movable from a position for supporting the helix member to another position to release the helix member to fall, and

(41) may be provided with a cooling tank containing a coolant below the coil spring supported by the supporting rod.

A method of heat treatment of a coil spring of the present invention for achieving the above second object comprises

(42) supporting the coil spring turnably in a direction of the periphery thereof by a ceramic supporting rod inserted into a hollow of the coil spring formed from a material which is transformed from ferromagnetic to paramagnetic by temperature elevation above the magnetic transformation point,

(43) induction-heating opposed portions of the peripheral face of the coil spring, supported by the supporting rod on the both sides of the supporting rod, by bringing an induction-heating coil near to the opposed portions, and

(44) allowing the coil spring to turn by a magnetic force, when the belt zone has been heated above a predetermined temperature, to bring portions other than the opposed portions near to the induction coil, and induction-heating the portions.

(45) The coil spring is allowed to fall, when the coil spring has heated up to a predetermined hardening temperature, into a cooling tank containing a coolant by pulling the supporting rod out of the hollow portion of the coil spring.

The coil spring includes various coil-shaped members such as valve springs.

BRIEF DESCRIPTION OF DRAWINGS

FIG. 5(a) is a schematic cross-sectional view of a rectangular prismatic workpiece having two belt-shaped zones having been heated: FIG. 4(b) is a cross-sectional view of the prismatic workpiece having been turned by a magnetic force.

FIG. 6(a) is a schematic cross-sectional view of a cylindrical workpiece having three belt-shaped zones having been induction-heated simultaneously: FIG. 6(b) is a cross-sectional view of the cylindrical workpiece having been turned by a magnetic force.

FIG. 7(a) is a schematic cross-sectional view of a cylindrical workpiece having four belt-shaped zones having been induction-heated simultaneously: FIG. 6(b) is a cross-sectional view of the cylindrical workpiece having been turned by a magnetic force.

FIG. 11(a) is a cross-sectional view illustrating schematically a cylindrical workpiece having two belt-shaped zones having been heated by the heat-treatment apparatus of FIG. 8: FIG. 11(b) a cross-sectional view of the cylindrical workpiece having been turned by a magnetic force.

FIG. 12(a) is a schematic cross-sectional view of a rectangular prismatic workpiece having two belt-shaped zones having been heated: FIG. 12(b) is a cross-sectional view of the prismatic workpiece having been turned by a magnetic force.

FIG. 13(a) is a schematic cross-sectional view of a cylindrical workpiece having three belt-shaped zones induction-heated simultaneously: FIG. 13(b) is a cross-sectional view of the cylindrical workpiece turned by a magnetic force.

FIG. 14(a) is a schematic cross-sectional view of a cylindrical workpiece having four belt-shaped zones induction-heated simultaneously: FIG. 14(b) is a cross-sectional view of the cylindrical workpiece having been turned by a magnetic force.

FIG. 17 is a schematic drawing of a heating state of a helix member.

FIG. 20 is a schematic drawing of a heating state of a helix member.

FIG. 23 is a schematic drawing of a heating state of a helix member.

FIGS. 26(a)-26(c) illustrates a process of the heat treatment. FIG. 26(a) illustrates setting of a coil-shaped member. FIG. 26(b) illustrates a state of induction heating of the coil member. FIG. 26(c) illustrates a coil-shaped member dropped by movement of a supporting bar to a release position.

FIG. 27(a) is a schematic cross-sectional view of a coil-shaped member having a pair of counterposed portions induction-heated. FIG. 27(b) is a schematic cross-sectional view of the coil member having been turned by a magnetic force.

BEST MODE FOR CARRYING OUT THE INVENTION

Figure 1:
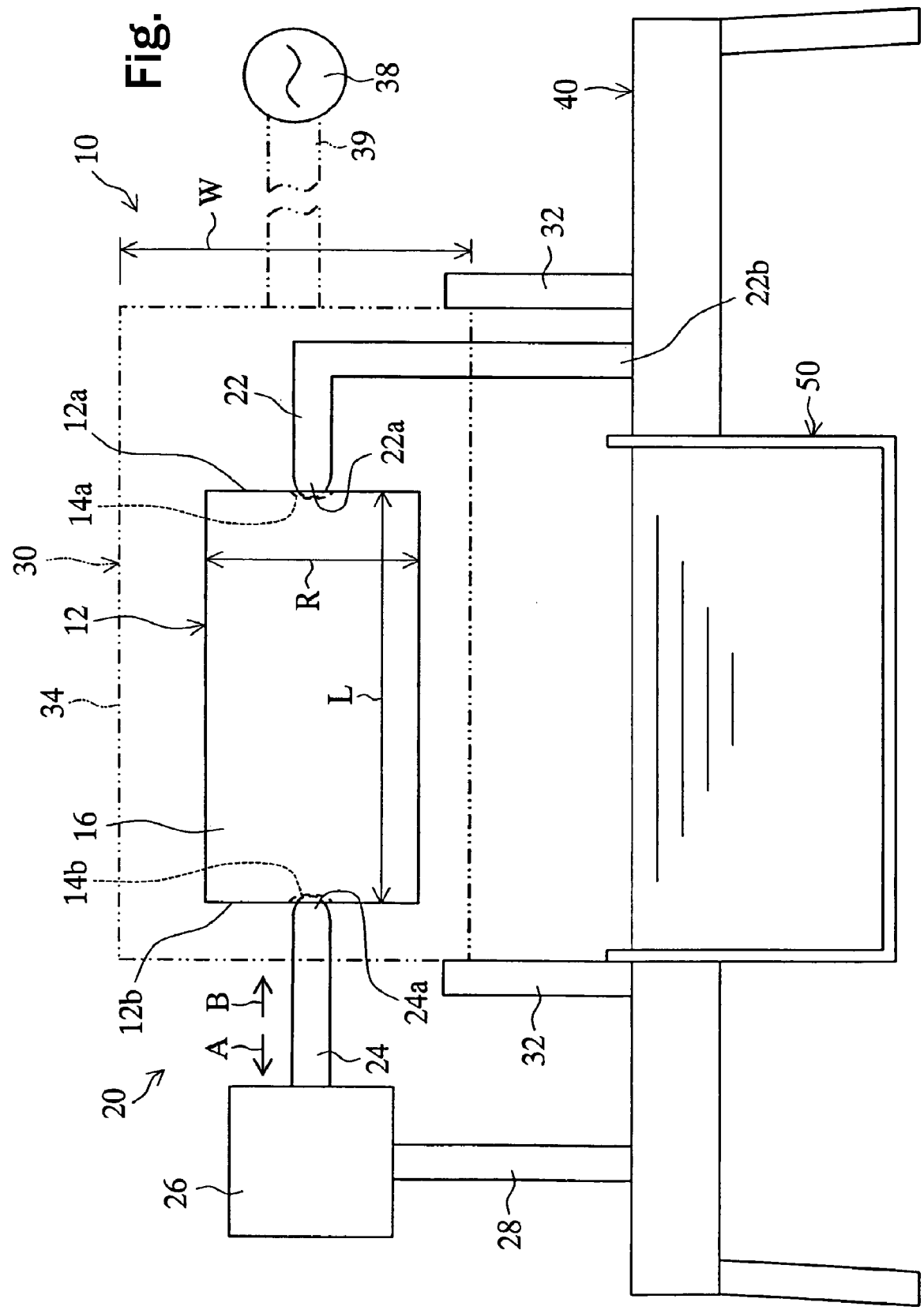
FIG. 1 is a schematic front view of a heat-treatment apparatus employed in Example 1.
Figure 2:
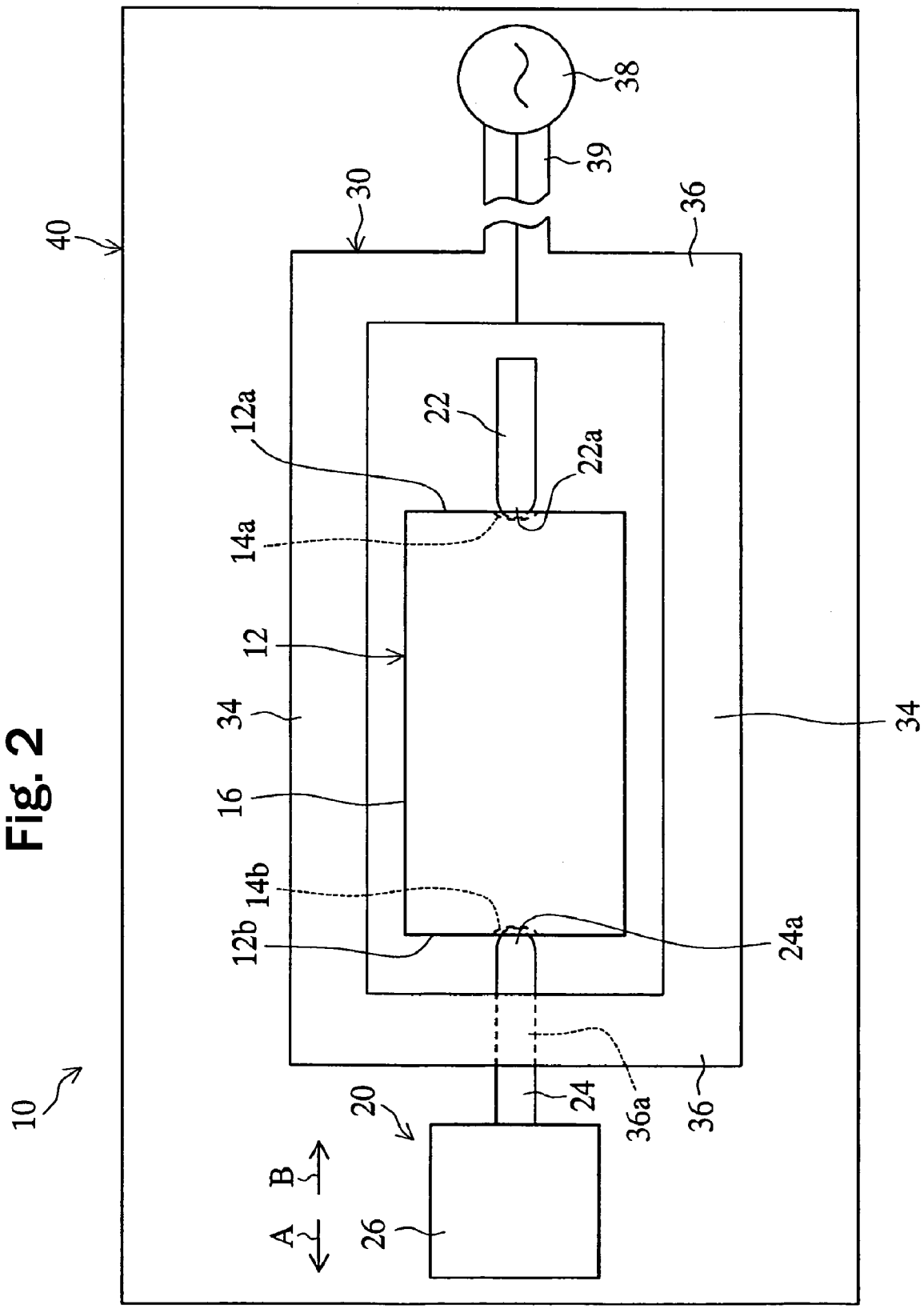
FIG. 2 is a schematic plan view of the heat-treatment apparatus of FIG. 1.

The heat treatment apparatus and the heat treatment method of the present invention are applicable to heat-treatment of a material having a magnetic transformation point.

The present invention provides a heat treatment method and a heat treatment apparatus for heat treatment of suspension springs for automobiles, valve springs of automobile engines, front fork suspension springs of bicycles and motorbikes, and coil springs for industrial machines.

The present invention is explained by reference to drawings.

Example 1

Example 1 of the present invention is explained by reference to FIGS. 1-7.

The heat treatment apparatus 10 has a supporting unit 20 (an example of a supporting means) for supporting a columnar workpiece 12 to be turnable, and an induction-heating coil 30 made of copper for induction-heating a workpiece 12 supported turnably by the supporting unit 20. The induction-heating coil 30 is fixed through a ceramic pillar 32 to a pedestal 40. Below the workpiece 12 supported by the supporting unit 20, a cooling tank 50 is placed containing a liquid coolant.

The columnar workpiece 12 is a solid body having no hole or no void inside. A dent 14a or 14b is provided at the center of the respective end faces 12a,12b of the workpiece 12. The workpiece 12 is made of steel such as carbon steel for machine structure and spring steel. The material of the workpiece 12 has a magnetic transformation point (Curie point) at 770° C. in this Example as shown in a Fe—C equilibrium diagram. At a temperature below the magnetic transformation point, the workpiece 12 is ferromagnetic. The ferromagnetic workpiece 12 transforms to be paramagnetic at a temperature above the magnetic transformation point.

The supporting unit 20 has a first supporting bar 22 and a second supporting bar 24: the first supporting bar 22 is made of a ceramic material and supports the workpiece 12 at the end face 12a in the length direction of the workpiece 12, and the second supporting bar 24 is also made of a ceramic material and supports the workpiece 12 at the other end face 12b in the length direction of the workpiece 12. The first supporting bar 22 and the second supporting bar 24 are arranged on a common line. The two supporting bars 22,24 are an example of the turning axis of the present invention.

The tip 22a of the first supporting bar 22 is inserted into the dent 14a to hold the workpiece to be turnable. The rear end portion of the first supporting bar 22 is bent at nearly a right angle downward and is fixed at the lower end 22b to the pedestal 40. The tip 24a of the second supporting bar 24 is fitted into the dent 14b to hold the workpiece turnable. The other end portion of the second supporting bar 24 is connected to a cylinder 26. The second supporting bar 24 is moved in the direction shown by arrow A or B by the movement of the cylinder 26. The cylinder 26 is fixed by a pillar 28 to the pedestal 40.

The workpiece 12 is supported by the supporting unit 20 by the following operation. The cylinder 26 is driven to move the second supporting bar 24 in the arrow-A direction to keep the distance between tip 22a and the tip 24a to be longer than the length L of the workpiece 12. The dent 14a of the workpiece 12 is fit to the first supporting bar 22. Then the cylinder 26 is driven to move the second supporting bar 24 in the arrow B direction to fit the tip 24a into the dent 14b of the workpiece 12. Thereby the workpiece 12 comes to be supported by the supporting unit 20 to be turnable by external force or a like force.

The position of the second supporting bar 24 having been moved to the arrow-B direction for supporting the workpiece 12 is called a supporting position, and the position of the second supporting bar 24 having been moved in the arrow A direction for releasing the workpiece 12 is called a releasing position in the present invention.

The induction-heating coil 30 is rectangular in shape when viewed from the top side. The workpiece 12 is placed inside this rectangle. The induction-heating coil 30 is constituted of a pair of long-side partial coils 34,34 corresponding to a pair of the long sides of the rectangle (examples of partial coils in the present invention), a pair of short-side partial coils 36,36 corresponding to the short sides of the rectangle, and a connecting coil 39 for connecting the one short-side coil 36 to a high frequency source 38. The long-side partial coils 34,34 are longer than the length L of the workpiece 12, and the short-side partial coils 36,36 are longer than the diameter R of the workpiece 12. The width W of the long-side partial coils 34,34 and the short-side partial coils 36,36 are larger than the diameter R of the workpiece 12 as shown in FIG. 1. The one short-side partial coil 36, not connected to the connecting coil 39, of the pair of the short-side coils 36,36 has a through hole 36a for penetration of the second supporting bar 24.

The pair of the long-side partial coils 34,34 are counterposed with interposition of the workpiece 12 supported by the supporting unit 20, extending in parallel to the length direction of workpiece 12 (arrow-A direction and arrow-B direction, an example of the parallel direction in the present invention). Therefore, the long-side partial coils 34,34 face the belt zones 16 of the workpiece 12 extending parallel to the first supporting bar 22 and the second supporting bar 24. The belt zone signifies not only a flat, thin, long, and narrow portion but also a curved, or slightly thick plate portion.

A method is explained for quench-hardening the workpiece 12 with the heat treatment apparatus 10.

Firstly the cylinder 26 is driven to move the second supporting bar 24 in the arrow-A direction. The dent 14a of the workpiece 12 is allowed to fit to tip 22a of the first supporting bar 22, and then the cylinder 26 is driven to move the second supporting bar 24 in the arrow-B direction to insert the tip 24a into the dent 14b of the workpiece 12. Thereby, the workpiece 12 is supported by the supporting unit 20 to be turnable by an external force or a like force.

Figure 4:
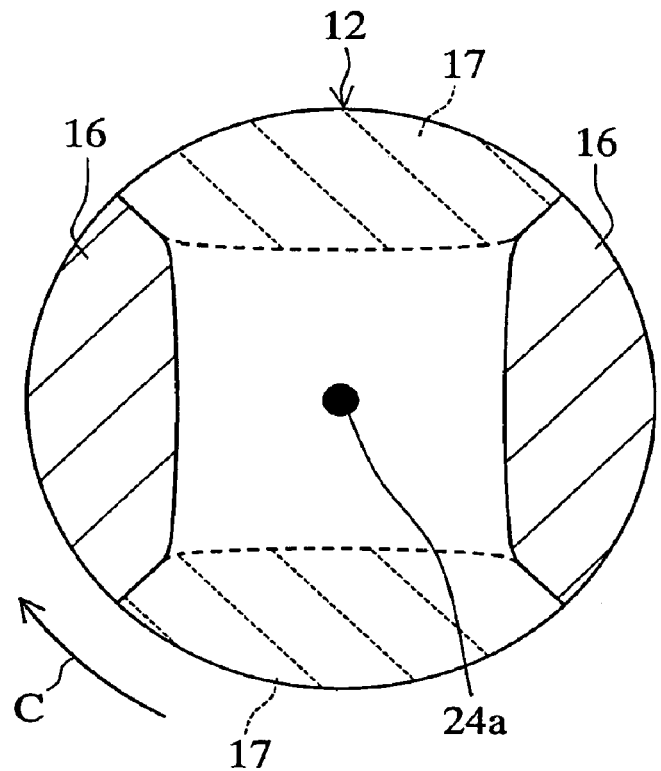
FIG. 4(a) is a schematic cross-sectional view of a cylindrical workpiece having two belt-shaped zones having been heated by the heat-treatment apparatus of FIG. 1.
FIG. 4(b) a cross-sectional view of the cylindrical workpiece having been turned by a magnetic force.

Subsequently, a prescribed electric power is applied from a high-frequency source 38 to the induction-heating coil 30 for a prescribed time. The quantity of the power and the time of the power application depend on whether the surface layer of the workpiece 12 is quench-hardened or the entire of the workpiece 12 is quench-hardened (total hardening). For example, electricity is applied at a power of 80 kW, a voltage of 440 V, a frequency of 49.8 kHz, for a time of 3.5 seconds. Such a large amount of power supply in a short time from the high-frequency power source 38 to the induction-heating coil 30 heats the belt zones 16 (portions marked by oblique lines in FIG. 4) of the workpiece 12 facing the long-side partial coils 34,34 as shown in FIG. 4(a) in a short time (3.5 seconds in this example) from room temperature to a quench-hardening temperature (e.g., 900° C.).

In the course of the induction heating of the belt zones 16 to the quench-hardening temperature, the belt zones 16 are heated through the magnetic transformation temperature (770° C. in this example), and could be transformed from ferromagnetic to paramagnetic. However, in the practical operation, the heating is not conducted in an equilibrium state. It was found experimentally that the transformation of the belt zones 16 from ferromagnetic to paramagnetic is not caused by passage through the magnetic transformation point but occurs immediately after the belt zones 16 have reached the quench-hardening temperature. On the other hand, unheated portions 17 of the workpiece 12 other than the belt zones 16 are kept ferromagnetic. Therefore, the workpiece 12 is driven by the magnetic field produced by the induction-heating coil 30 to turn by an angle of 90° around the turning axis (first supporting bar 22 and second supporting bar 24) in the arrow-C direction (or reverse peripheral direction). As the result, as shown in FIG. 4(b), the belt zones 16 come to be placed at upper and lower positions, and unheated portions 17 come to face the long-side partial coils 34,34. In this state also, the electric power is kept applied continuously to the induction-heating coil 30, so that the unheated belt zones 17 come to be induction-heated, following the belt zones 16, to reach the quench-hardening temperature in 3.5 seconds.

Figure 3:
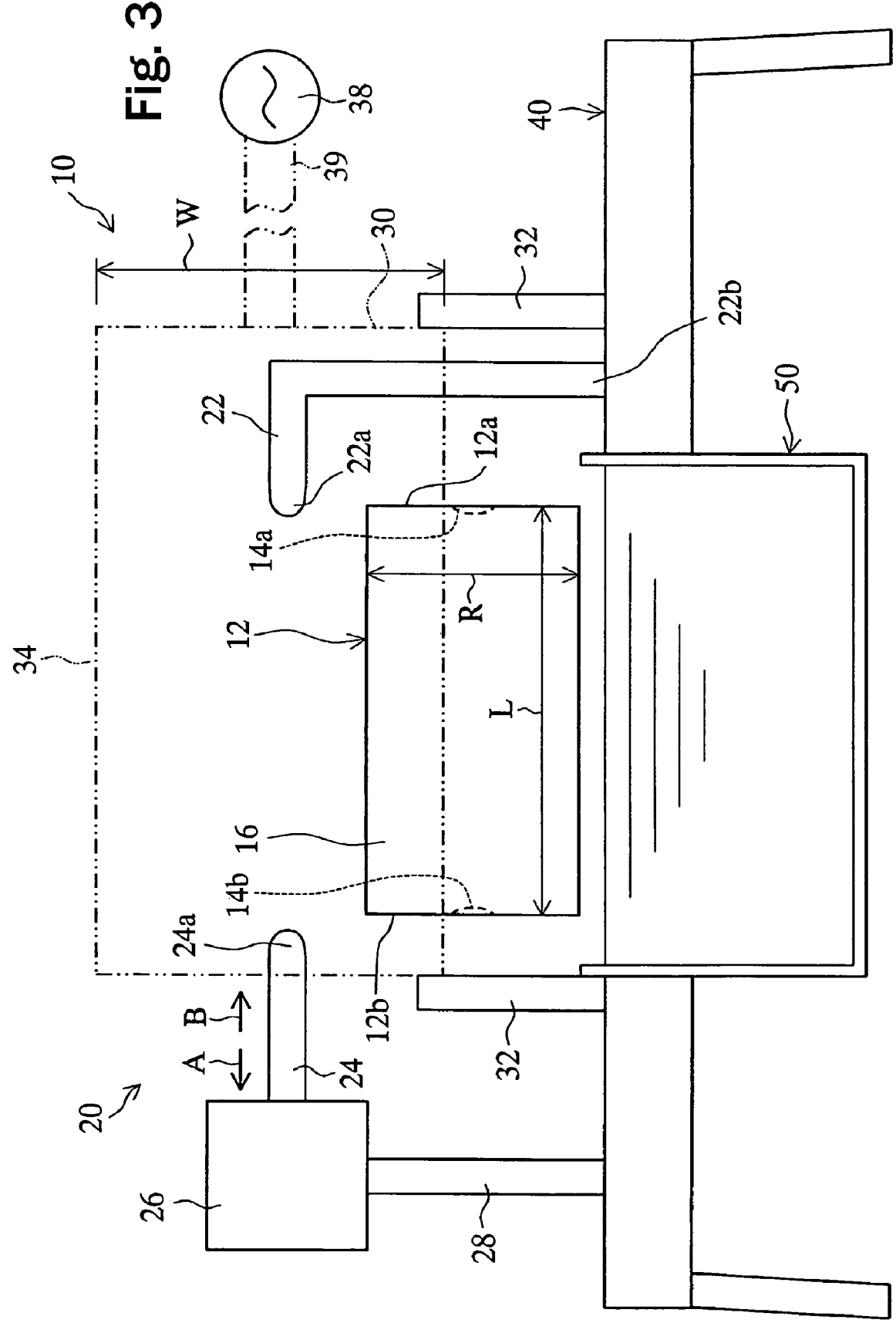
FIG. 3 is a front view illustrating a heat-treatment apparatus at an instant when a workpiece is just falling.

The aforementioned cylinder 26 is controlled by a controller (not shown in the drawing) for controlling the high-frequency power source 38. This controller controls the cylinder 26 to move the second supporting bar 24 in the arrow-A direction, at the time of 7.0 seconds after the start of the electric power supply from the high-frequency source 38 to the induction-heating coil 30, to a releasing position. Thereby, the workpiece 12 is released to fall 7.0 seconds after the start of the induction heating of the workpiece 12 as shown in FIG. 3. Therefore, at the time of 7.0 seconds after the start of the induction-heating of the workpiece 12, the portion of the prescribed thickness of the peripheral face of the workpiece 12 reaches the quench-hardening temperature as shown in FIG. 4(b). The workpiece 12 in this state is released to fall into a cooling tank 50, whereby the portion of the prescribed thickness of the periphery of the workpiece 12 is quenched and hardened.

As explained above, immediately after portions of the workpiece 12 (belt zones 16 in this example) are induction-heated up to a prescribed temperature (quench-hardening temperature), the workpiece 12 is turned by a magnetic force, and successively other portions (unheated portions 17 in this example) are induction-heated, whereby the peripheral face of the workpiece 12 is uniformly induction-heated to a prescribed depth. Since the workpiece 12 is turned not by a driving source like a motor, deviation of the timing of the start of turning will not be caused by electrical or mechanical error. Therefore, the prescribed portions of the workplace 12 are uniformly induction-heated and hardened.

In the above example, the workpiece 12 is columnar. Otherwise, a prism-shaped workpiece 13 can be hardened uniformly at prescribed portions by the heat treatment apparatus 10 as shown in FIGS. 5(a) and 5(b). In this case, when the belt zones 13a have reached the quench-hardening temperature as shown in FIG. 5(a), the workpiece 13 is allowed to turn in the arrow-C direction by an angle of 90° as shown in FIG. 5(b) with the belt zones 13a placed at the upper and lower positions with the unheated portions 13b facing the long-side partial coils 34,34. In this state also, the electric power is kept supplied continuously to the induction-heating coil 30, so that the unheated belt zones 13b are induction-heated to reach the quench-hardening temperature in 3.5 seconds. Thus, belt zones 13a and the unheated zones 13b are hardened in the same way as above.

In the above examples, the workpiece 12 is divided into four belt zones along the periphery thereof, and two non-adjacent belt zones 16 are induction-heated simultaneously by the opposing long-side partial coils 34,34, and successively the rest of the belt zones 17 (unheated portions) are induction-heated. Otherwise, as shown in FIG. 6, the workpiece 12 is divided along the periphery into six belt zones and the three non-adjacent belt zones 16,16,16 are induction-heated by partial coils 44a,44b,44c, and then the workpiece is turned by an angle of 60° in the arrow-C direction (in the peripheral direction), and the remaining three belt zones 17,17,17 (unheated portions) are induction-heated. In this case, partial coils 44b,44c are constructed to be movable outside not to obstruct the falling workplace 12.

In still another example, as shown in FIG. 7, the workpiece 12 is divided into eight belt zones along the periphery and the non-adjacent four belt zones 16,16,16,16 are induction-heated by partial coils 45a,45b,45c,45d, and then the workpiece is turned by an angle of 45° in the arrow-C direction (in the peripheral direction of the workpiece 12), and the remaining four belt zones 17,17,17,17 (unheated portions) are induction-heated. In this case, the partial coil 45c is constructed to be movable outside not to obstruct the falling workpiece 12.

In the case where the quick cooling is not conducted, the partial coils need not be movable, and the cooling tank is not necessary.

Example 2

Example 2 of the present invention is explained by reference to FIGS. 8-14.

The heat treatment apparatus 60 has a supporting unit 70 (an example of a supporting means) for supporting a tubular workpiece 62 to be turnable, and an induction-heating coil 80 for induction-heating a workpiece 62 supported turnably by the supporting unit 70. The induction-heating coil 80 is fixed through a ceramic pillar 82 or the like to a pedestal 90. Below the workpiece 62 supported by the supporting unit 70, a cooling tank 92 is placed containing a liquid coolant.

The tubular workpiece 62 has a through-hole 64 (a hollow) extending in the length direction at the center portion of the cross-section. The workpiece 62 is made of steel such as carbon steel for machine structure and spring steel. The material of the workpiece 12 has a magnetic transformation point (Curie point) at 770° C. in this Example as shown in a Fe—C equilibrium diagram. At a temperature below the magnetic transformation point, the workpiece 62 is ferromagnetic. The ferromagnetic workpiece 62 transforms to be paramagnetic at a temperature above the magnetic transformation point.

The supporting unit 70 has a rod member 72 made of a ceramic material to be inserted into the through-hole 64 of the workpiece 62. This rod member 72 is an example of the turning axis of the present invention. The supporting unit 70 has also a supporting plate 74 having a dent 74a for fitting to the tip portion 72a of the rod member 72. This supporting plate 74 is placed and fixed inside the induction-heating coil 80. The other end of the rod member 72 is connected to a cylinder 76. The rod member 72 is moved by driving the cylinder 76 in the arrow-A direction or the arrow-B direction. The cylinder 76 is fixed by a supporting pillar 78 to a pedestal 90.

The workpiece 62 is supported by the supporting unit 70 by the following operation. The cylinder 76 is driven to move the rod member 72 in the arrow-A direction to allow the tip 72a thereof to intrude slightly into the inside space of the induction-heating coil 80. The workpiece 62 is placed inside the induction-heating coil 80. Next, the rod member 72 is moved by driving the cylinder 76 in the arrow-B direction and to penetrate the through-hole 64 of the workpiece 62 and to fit the tip 72a of the rod member 72 into a dent 74a of the supporting plate 74. Thereby the workpiece 62 comes to be supported by the supporting unit 70 to be turnable by external force or a like force.

The position of the rod member 72 having been moved to the arrow-B direction for supporting the workpiece 62 is called a supporting position, and the position of the rod member 72 having been moved in the arrow A direction for releasing the workpiece 62 is called a releasing position in the present invention.

Figure 8:
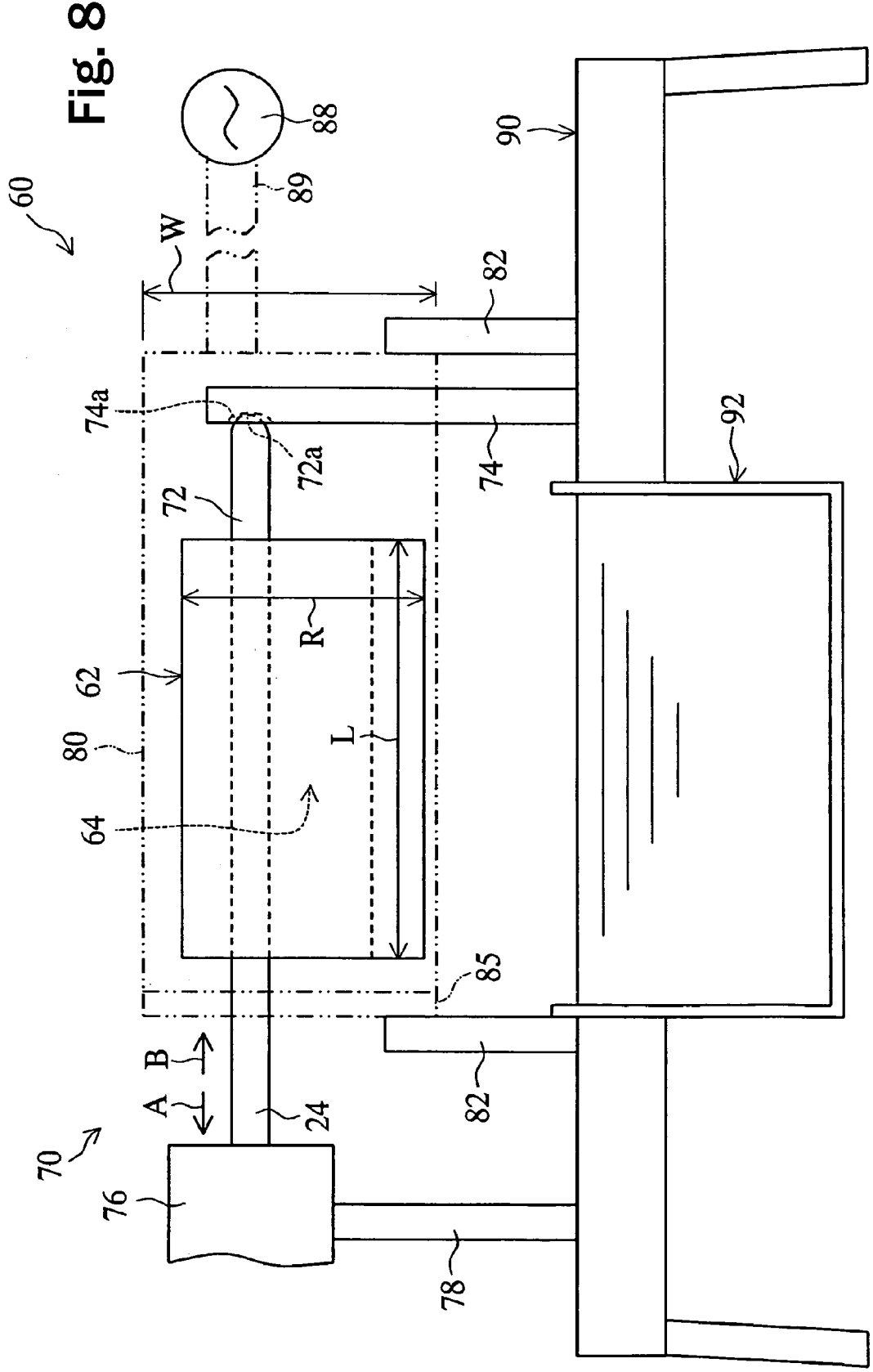
FIG. 8 is a schematic front view of a heat-treatment apparatus employed in Example 2.
Figure 9:
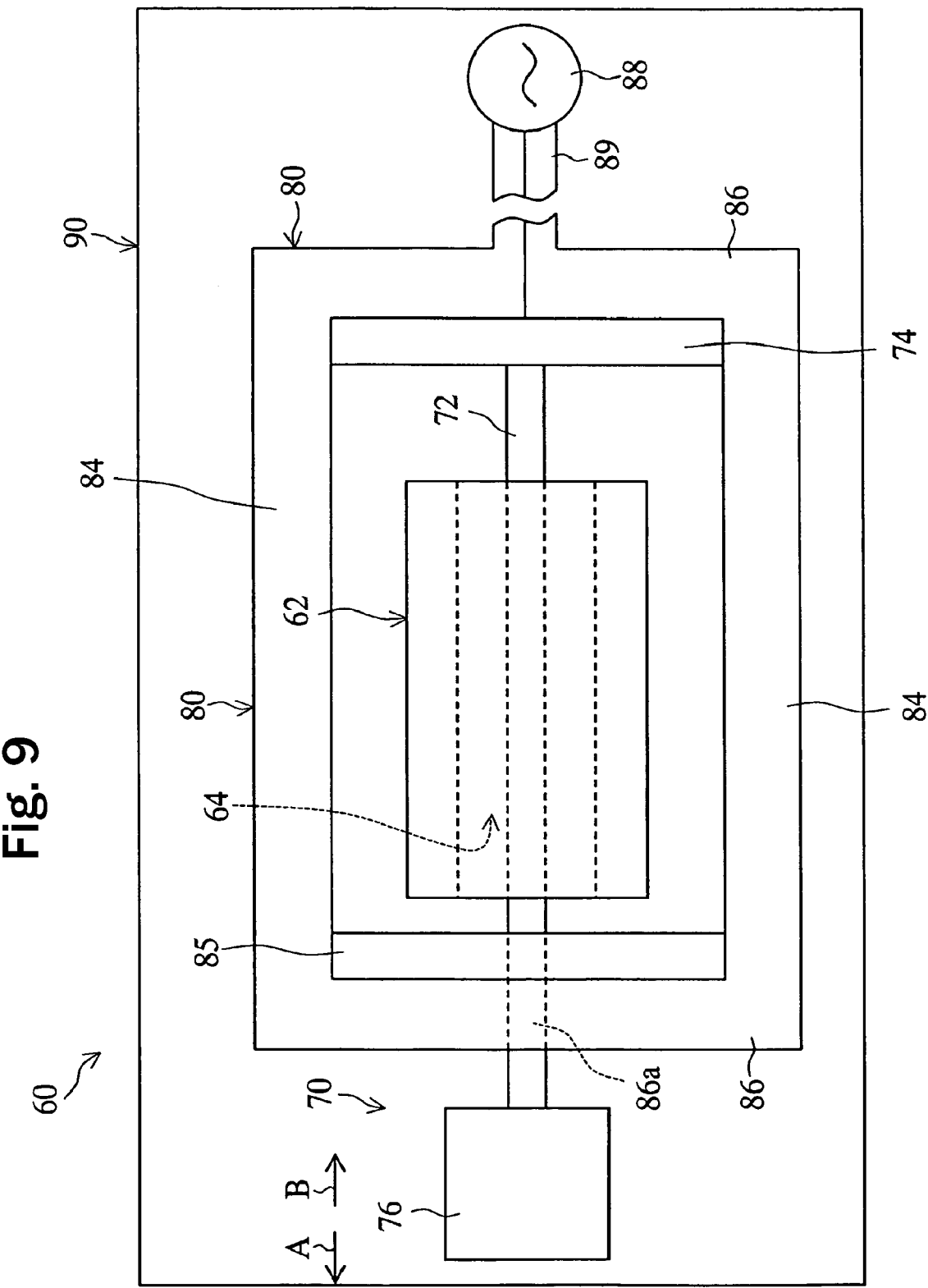
FIG. 9 is a schematic plan view of the heat-treatment apparatus of FIG. 8.

The induction-heating coil 80 is rectangular in shape when viewed from the top side as shown in FIG. 9. The workpiece 62 is placed inside this rectangle. The induction-heating coil 80 is constituted of a pair of long-side partial coils 84,84 corresponding to a pair of the long sides of the rectangle (examples of partial coils in the present invention), a pair of short-side partial coils 86,86 corresponding to the short sides of the rectangle, and a connecting coil 89 for connecting the one short-side coil 86 to a high frequency source 88. The long-side partial coils 84,84 are longer than the length L of the workpiece 62, and the short-side partial coils 86,86 are longer than the diameter R of the workpiece 62. The width W of the long-side partial coils 84,84 and the short-side partial coils 86,86 are larger than the diameter R of the workpiece 62 as shown in FIG. 8. The one short-side partial coil 86, not connected to the connecting coil 89, of the pair of the short-side coils 86,86 has a through-hole 86a for penetration of the rod member 72. Further, inside the short side 86, a stopper plate 85 made of a ceramic material is fixed inside the short side 86 to prevent contact of the workpiece 62 with the short side 86.

The pair of the long-side partial coils 84,84 are counterposed with interposition of the workpiece 62 supported by the supporting unit 70, extending in parallel to the length direction of workpiece 62 (arrow-A direction and arrow-B direction, an example of the parallel direction in the present invention). Therefore, the long-side partial coils 84,84 face the belt zones 76 of the workpiece 62 extending parallel to the rod member 72. The belt zone signifies not only a flat, thin, long, and narrow portion but also a curved, or slightly thick plate portion.

A method is explained for quench-hardening the workpiece 62 with the heat treatment apparatus 60.

Firstly the cylinder 76 is driven to move the rod member 72 in the arrow-A direction to keep the tip 72a of the rod member 72 a little inside the induction-heating coil 80. In this state, the workpiece 62 is placed inside the induction-heating coil 80. Then the cylinder 76 is driven to move the rod member 72 in the arrow-B direction to allow the rod member 72 to penetrate the through-hole 64 of the workpiece 62 and to allow the tip 72a of the rod member 72 to fit into a dent 74a of the supporting plate 74. Thus the workpiece 62 is supported by the supporting unit 70 to be turnable by an external force or a like force.

Subsequently, a prescribed electric power is applied from a high-frequency source 88 to the induction-heating coil 80 for a prescribed time. The quantity of the power and the time of the power application depend on whether the surface layer of the workpiece 62 is quench-hardened or the entire of the workpiece 62 is quench-hardened (total hardening). For example, electricity is applied at a power of 80 kW, a voltage of 440 V, a frequency of 49.8 kHz for a time of 2.5 seconds. Such a large amount of power supply in a short time from the high-frequency power source 88 to the induction-heating coil 80 induction-heats the belt zones 66 (portions marked by oblique lines in FIG. 11) of the workpiece 62 facing the long-side partial coils 84,84 as shown in FIG. 11(a) in a short time (2.5 seconds in this example) from room temperature to a quench-hardening temperature (e.g., 900° C.).

In the course of the induction heating of the belt zones 66 to the quench-hardening temperature, the belt zones 66 is heated through the magnetic transformation temperature (770° C. in this example), and could be transformed from ferromagnetic to paramagnetic. However, in the practical operation, the heating is not conducted in an equilibrium state. It was found experimentally that the transformation of the belt zones 66 from ferromagnetic to paramagnetic is not caused by passing the magnetic transformation point but occurs immediately after the belt zones 66 have reached the quench-hardening temperature. On the other hand, unheated portions 67 of the workpiece 62 other than the belt zones 66 are kept ferromagnetic. Therefore, the workpiece 62 is driven by the magnetic field produced by the induction-heating coil 80 to turn by an angle of 90° around the turning axis (axis parallel to rod member 72 penetrating the center of cross-section of work 62) in the arrow-C direction (or reverse direction, peripheral direction). As the result, as shown in FIG. 11(b), the belt zones 66 come to be placed at upper and lower positions, and unheated portions 67 come to face the long-side partial coils 84,84. In this state also, the electric power is kept applied continuously to the induction-heating coil 80, so that the unheated belt zones 67 are induction-heated, following the belt zones 66, to reach the quench-hardening temperature in 2.5 seconds.

Figure 10:
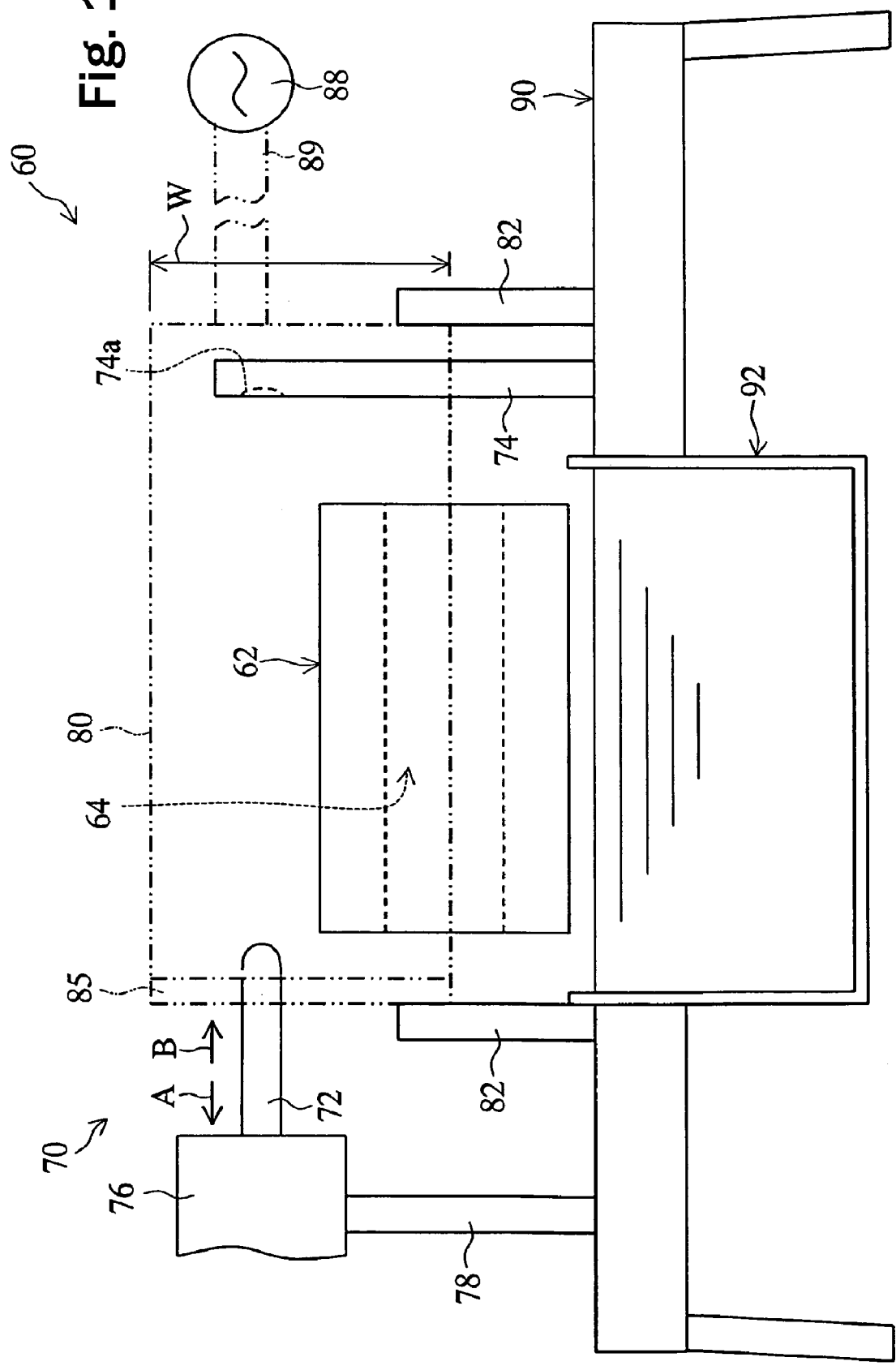
FIG. 10 is a front view of a heat-treatment apparatus at an instant when a workpiece is just falling.

The aforementioned cylinder 76 is controlled by a controller (not shown in the drawing) for controlling the high-frequency power source 88. This controller controls the cylinder 76 to move the rod member 72 in the arrow-A direction, at the time of 5.0 seconds after the start of the electric power supply from the high-frequency source 88 to the induction-heating coil 80, to a releasing position. Thereby, the workpiece 62 is released to fall 5.0 seconds after the start of the induction heating of the workpiece 62 as shown in FIG. 10. At the time of 5.0 seconds after the start of the induction-heating of the workpiece 62, the entire of the workpiece 62 reaches the quench-hardening temperature as shown in FIG. 11(b). The workpiece 62 in this state is released to fall into a cooling tank 92, whereby the entire of the workpiece 12 is quenched and hardened.

As explained above, immediately after portions of the workpiece 62 (belt zones 66 in this example) are induction-heated up to a prescribed temperature (quench-hardening temperature), the workpiece 62 is turned by a magnetic force, and successively other portions (unheated portions 67 in this example) are induction-heated, whereby the entire of the workpiece 62 is uniformly induction-heated. Since the workpiece 62 is turned not by a driving source like a motor, deviation of the timing of the start of turning will not be caused by electrical or mechanical error. Therefore, the prescribed portions of the workpiece 62 are uniformly induction-heated and hardened.

In the above example, the workpiece 62 is tubular. Otherwise, an empty square prism-shaped workpiece 63 can be hardened entirely and uniformly by the heat treatment apparatus 60 as shown in FIGS. 12(a) and 12(b). In this case, after the belt zones 63a have reached the quench-hardening temperature as shown in FIG. 12(a), the workpiece 63 is allowed to turn in the arrow-C direction by an angle of 90° as shown in FIG. 12(b) with the belt zones 63a placed at the upper and lower positions and with the unheated portions 63b facing the long-side partial coils 84,84. In this state also, the electric power is kept supplied continuously to the induction-heating coil 80, so that the unheated belt zones 63b are induction-heated to reach the quench-hardening temperature in 2.5 seconds. Thus, belt zones 63a and the unheated zones 63b are hardened in the same way as above.

In the above examples, the workpiece 62 is divided into four belt zones along the periphery thereof, and two non-adjacent belt zones 66 are induction-heated simultaneously by the opposing long-side partial coils 84,84, and successively the rest of the belt zones 67 (unheated portions) are induction-heated. Otherwise, as shown in FIG. 13, the workpiece 62 is divided along the periphery into six belt zones and the three non-adjacent belt zones 66,66,66 are induction-heated by partial coils 94a,94b,94c, and then the workpiece is turned by an angle of 60° in the arrow-C direction (in the peripheral direction), and the remaining three belt zones 67,67,67 (unheated portions) are induction-heated. In this case, partial coils 94b,94c are constructed to be movable outside not to obstruct the falling workpiece 62.

In still another example, as shown in FIG. 14, the workpiece 62 is divided along the periphery into eight belt zones and the non-adjacent four belt zones 66,66,66,66 are induction-heated by partial coils 95a,95b,95c,95d, and then the workpiece is turned by an angle of 45° in the arrow-C direction (in the peripheral direction of the workpiece 62), and the remaining four belt zones 67,67,67,67 (unheated portions) are induction-heated. In this case, the partial coil 95c is constructed to be movable outside not to obstruct the falling workpiece 62.

Example 3

Example 3 of the present invention is explained by reference to FIGS. 15-17.

The heat treatment apparatus 100 is an apparatus for quench-hardening a conical helix member 102. The heat treatment apparatus 100 has a supporting unit 110 (an example of a supporting means in the present invention) for supporting the helix member 102 to be turnable, and an induction-heating coil 120 for induction-heating the helix member 102 supported turnably by the supporting unit 110. The induction-heating coil 120 is fixed through a ceramic pillar 123 or the like to a pedestal 130. Below the helix member 102 supported by the supporting unit 110, a cooling tank 132 is placed which contains a liquid coolant.

The helix member 102 is formed by winding a wire material in a shape of a conical helix.

The helix member 102 is made of steel such as carbon steel for machine structure and spring steel. The material of the helix member 102 has a magnetic transformation point (Curie point) at 770° C. in this Example as shown in a Fe—C equilibrium diagram. At a temperature below the magnetic transformation point, the helix member 102 is ferromagnetic. The ferromagnetic helix member 102 transforms to be paramagnetic at a temperature above the magnetic transformation point.

The supporting unit 110 has a conical supporting bar 112 made of a ceramic material to be inserted into the empty space 104 in the helix member 102. The supporting unit 110 has also a supporting plate 124 having a dent 124a for holding the tip portion 112a of the supporting bar 112. This supporting plate 124 is made of a ceramic material, and placed and fixed inside the induction-heating coil 120. The other end of the supporting bar 112 is connected to a cylinder 105. The supporting bar 112 is moved by drive of the cylinder 105 in the arrow-A direction or the arrow-B direction. The cylinder 105 is fixed by a supporting pillar 107 to a pedestal 130.

The helix member 102 is supported by the supporting unit 110 by the following operation. The cylinder 105 is driven to move the supporting bar 112 in the arrow-A direction to allow the tip 112a thereof to intrude slightly into the inside space of the induction-heating coil 120. The helix member 102 is placed inside the induction-heating coil 120. Next, the supporting bar 112 is moved by driving the cylinder 105 in the arrow-B direction and to penetrate the empty space 104 of the helix member 102 to fit the tip 112a of the supporting bar 112 into a dent 124a of the supporting plate 124. Thereby the helix member 102 comes to be supported by the supporting unit 110 to be turnable by external force or a like force.

The position of the supporting bar 112 having been moved to the arrow-B direction for supporting the helix member 102 is called a supporting position, and the position of the supporting bar 112 having been moved in the arrow A direction for releasing the helix member 102 is called a releasing position in the present invention.

Figure 15:
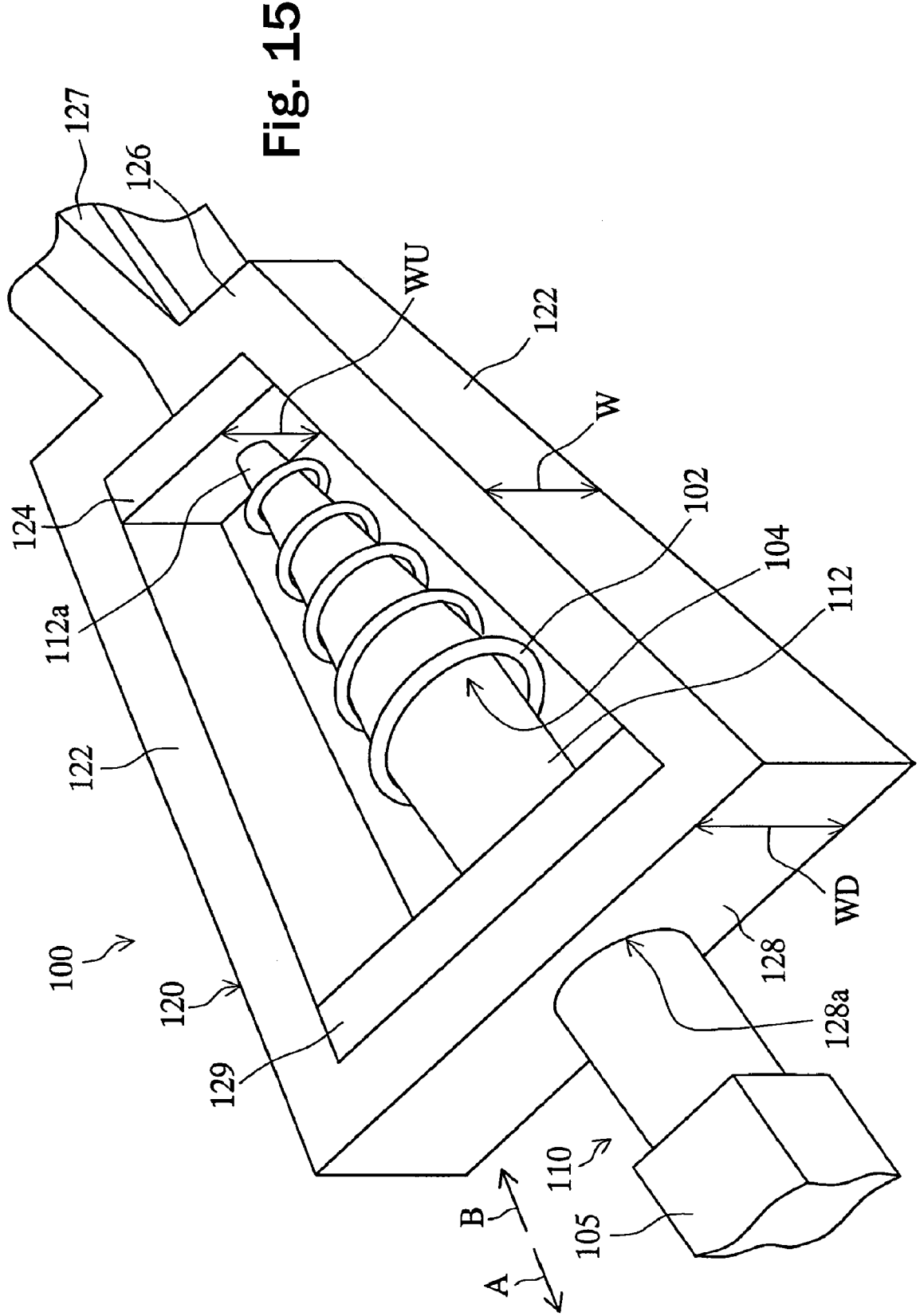
FIG. 15 is a schematic perspective view of the heat-treatment apparatus employed in Example 3.
Figure 16:
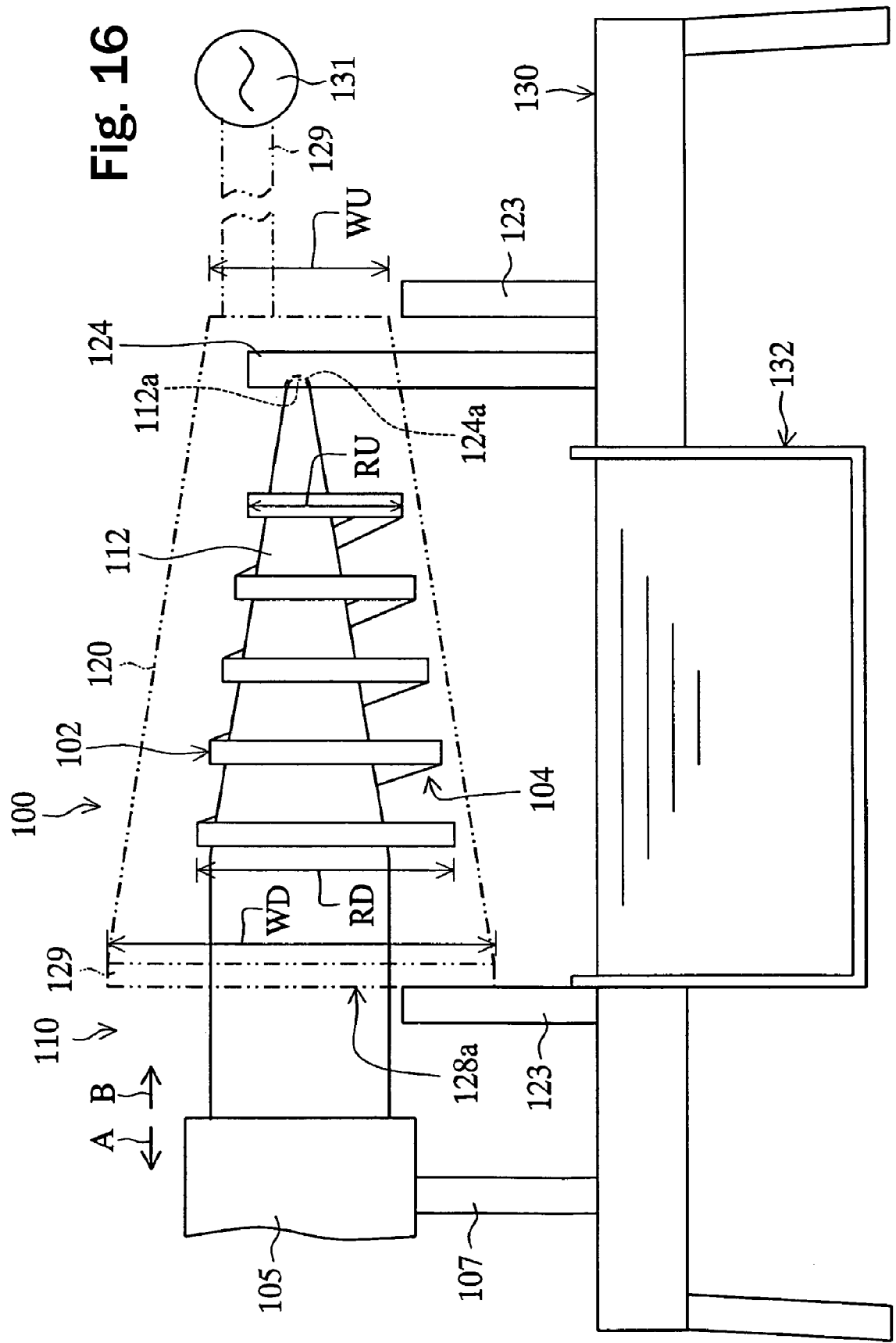
FIG. 16 is a front view of the heat-treatment apparatus shown in FIG. 15.

The induction-heating coil 120 is trapezoidal in shape when viewed from the top side as shown in FIG. 15. The helix member 102 is placed inside this trapezoid. The induction-heating coil 120 has a pair of partial coils 122,122 counter-posed with interposition of the helix member 102 supported by the supporting bar 102. The pair of partial coils 122,122 are in a shape of a plate extending along the peripheral face of the helix member 102 in the length direction. The width W of the pair of partial coils 122,122 is decreased in correspondence with decrease of the diameter of the helix member 102. The supporting bar 112 is placed between the pair of the partial coil 122,122 and extends parallel to the pair of the partial coils 122,122. The pair of the partial coils 122,122 have a length (height) larger than that of the helix member 102.

The induction-heating coil 120 has further an upper-side partial coil 126 corresponding to the upper side of the trapezoid, a lower-side partial coil 128 corresponding to the lower side of the trapezoid, and a connecting coil 127 for connecting the upper-side partial coil 126 to a high frequency power source 131. The width WU of the upper-side partial coil 126 is slightly larger than the outside diameter RU of the upper end of the helix member 102, and the width WD of the lower-side partial coil 128 is slightly larger than the outside diameter RD of the lower end of the helix member 102. The lower-side partial coil 128 has a through-hole 128a for penetration of the supporting bar 112. Further, inside the lower-side partial coil 128, a stopper plate 129 made of a ceramic material is fixed to prevent contact of the helix member 102 with the lower-side partial coil 128.

A method is explained for quench-hardening the helix member 102 with the heat treatment apparatus 100.

Firstly the cylinder 105 is driven to move the supporting bar 112 in the arrow-A direction to allow the tip 112a of the supporting bar 112 to intrude a little into the inside of the induction-heating coil 120 (into the region surrounded by the coils 122,122,126,128). In this state, the helix member 102 is placed inside the induction-heating coil 120. Then the cylinder 105 is driven to move the supporting bar 112 in the arrow-B direction to penetrate the empty space 104 of the helix member 102, whereby the tip 112a of the supporting bar 112 is fitted into a dent 124a of the supporting plate 124. Thus the helix member 102 is supported by the supporting unit 110 to be turnable by an external force or a like force.

Subsequently, a prescribed electric power is applied from a high-frequency source 131 to the induction-heating coil 120 for a prescribed time. The quantity of the power and the time of the power application depend on whether the surface layer of the helix member 102 is quench-hardened or the entire of the helix member 102 is quench-hardened (total hardening). For example, electricity is applied at a power of 80 kW, a voltage of 440 V, a frequency of 49.8 kHz, for a time of 2.5 seconds. Such a large amount of power supply in a short time from the high-frequency power source 131 to the induction-heating coil 120 heats the counterposed portions 106 facing the pair of the partial coils 122,122 of the helix member 102 (portions indicated by oblique lines in FIG. 17(a)) in a short time (2.5 seconds in this example) from room temperature to a quench-hardening temperature (e.g., 900° C.).

In the course of the induction heating of the coil-facing portions 106 to the quench-hardening temperature, the coil-facing portions 106 is heated through the magnetic transformation temperature (770° C. in this example), and could be transformed to change from ferromagnetic to paramagnetic. However, in the practical operation, the heating is not conducted in an equilibrium state. It was found experimentally that the transformation of the coil-facing portions 106 from ferromagnetic to paramagnetic is not caused by passing the magnetic transformation point but occurs immediately after the coil-facing portions 106 have reached the quench-hardening temperature. On the other hand, unheated portions 108 other than the coil-facing portions 106 are kept ferromagnetic. Therefore, the helix member 102 is driven by the magnetic field produced by the induction-heating coil 120 to turn by an angle of 90° around the turning axis (axis parallel to the supporting bar 112 penetrating the center of cross-section of helix member 102) in the arrow-C direction (or reverse direction, peripheral direction). As the result, as shown in FIG. 17(b), the counterposed belt zones 106 comes to be placed at upper and lower positions, and unheated portions 108 come to face the pair of the partial coil 122,122. In this state also, the electric power is kept applied continuously to the induction-heating coil 120, so that the unheated portions 108 are induction-heated, following the previous coil-facing portions 106, to reach the quench-hardening temperature in 2.5 seconds.

The aforementioned cylinder 105 is controlled by a controller (not shown in the drawing) for controlling the high-frequency power source 131. This controller controls the cylinder 105 to move the supporting bar 112 in the arrow-A direction, at the time of 5.0 seconds after the start of the electric power supply from the high-frequency source 131 to the induction-heating coil 120, to a releasing position. Thereby, the helix member 102 is released to fall 5.0 seconds after the start of the induction heating of the helix member 102. At the time of 5.0 seconds after the start of the induction-heating of the helix member 102, the entire of the helix member 102 reaches the quench-hardening temperature as shown in FIG. 17(b). The helix member 102 in this state is released to fall into a cooling tank 132, whereby the entire of the helix member 102 is quenched and hardened.

As explained above, immediately after portions of the helix member 102 (coil-facing portions 106 in this example) are induction-heated up to a prescribed temperature (quench-hardening temperature), the helix member 102 is turned by a magnetic force, and successively other portions (unheated portions 108 in this example) are induction-heated, whereby the entire of the helix member 102 is uniformly induction-heated. Since the helix member 102 is turned not by a driving source like a motor, deviation of the timing of the start of turning will not be caused by electrical or mechanical error.

Therefore, the prescribed portions of the helix member 102 are uniformly induction-heated and hardened.

Example 4

Example 4 of the present invention is explained by reference to FIGS. 18-20.

The heat treatment apparatus 200 is an apparatus for quench-hardening a barrel-shaped helix member 202. The heat treatment apparatus 200 has a supporting unit 210 (an example of a supporting means in the present invention) for supporting the helix member 202 to be turnable, and an induction-heating coil 220 for induction-heating the helix member 202 supported turnably by the supporting unit 210. The induction-heating coil 220 is fixed through a ceramic pillar 222 or the like to a pedestal 230. Below the helix member 202 supported by the supporting unit 210, a cooling tank 232 is placed containing a liquid coolant.

The helix member 202 is formed by winding a wire material in a shape of a barrel-shaped helix. The helix member 202 is made of steel such as carbon steel for machine structure and spring steel. The material of the helix member 202 has a magnetic transformation point (Curie point) at 770° C. in this Example as shown in a Fe—C equilibrium diagram. At a temperature below the magnetic transformation point, the helix member 202 is ferromagnetic. The ferromagnetic helix member 202 transforms to be paramagnetic at a temperature above the magnetic transformation point.

The supporting unit 210 has a supporting bar 212 made of a ceramic material to be inserted into the empty space 204 in the helix member 202. The supporting unit 210 has also a supporting plate 224 having a dent 224a for holding the tip portion 212a of the supporting bar 212. This supporting plate 224 is made of a ceramic material, and placed and fixed inside the induction-heating coil 220. The other end of the supporting bar 212 is connected to a cylinder 205. The supporting bar 212 is moved by drive of the cylinder 205 in the arrow-A direction or the arrow-B direction. The cylinder 205 is fixed by a supporting pillar 207 to a pedestal 230.

The helix member 202 is supported by the supporting unit 210 by the following operation. The cylinder 205 is driven to move the supporting bar 212 in the arrow-A direction to allow the tip 212a thereof to intrude slightly into the inside space of the induction-heating coil 220. The helix member 202 is placed inside the induction-heating coil 220. Next, the supporting bar 212 is moved by drive of the cylinder 205 in the arrow-B direction to penetrate the empty space 204 of the helix member 202 and to fit the tip 212a of the supporting bar 212 into a dent 224a of the supporting plate 224. Thereby the helix member 202 comes to be supported by the supporting unit 210 to be turnable by external force or a like force.

The position of the supporting bar 212 having been moved to the arrow-B direction for supporting the helix member 202 is called a supporting position, and the position of supporting bar 212 having been moved in the arrow A direction for releasing the helix member 202 is called a releasing position in the present invention.

Figure 18:
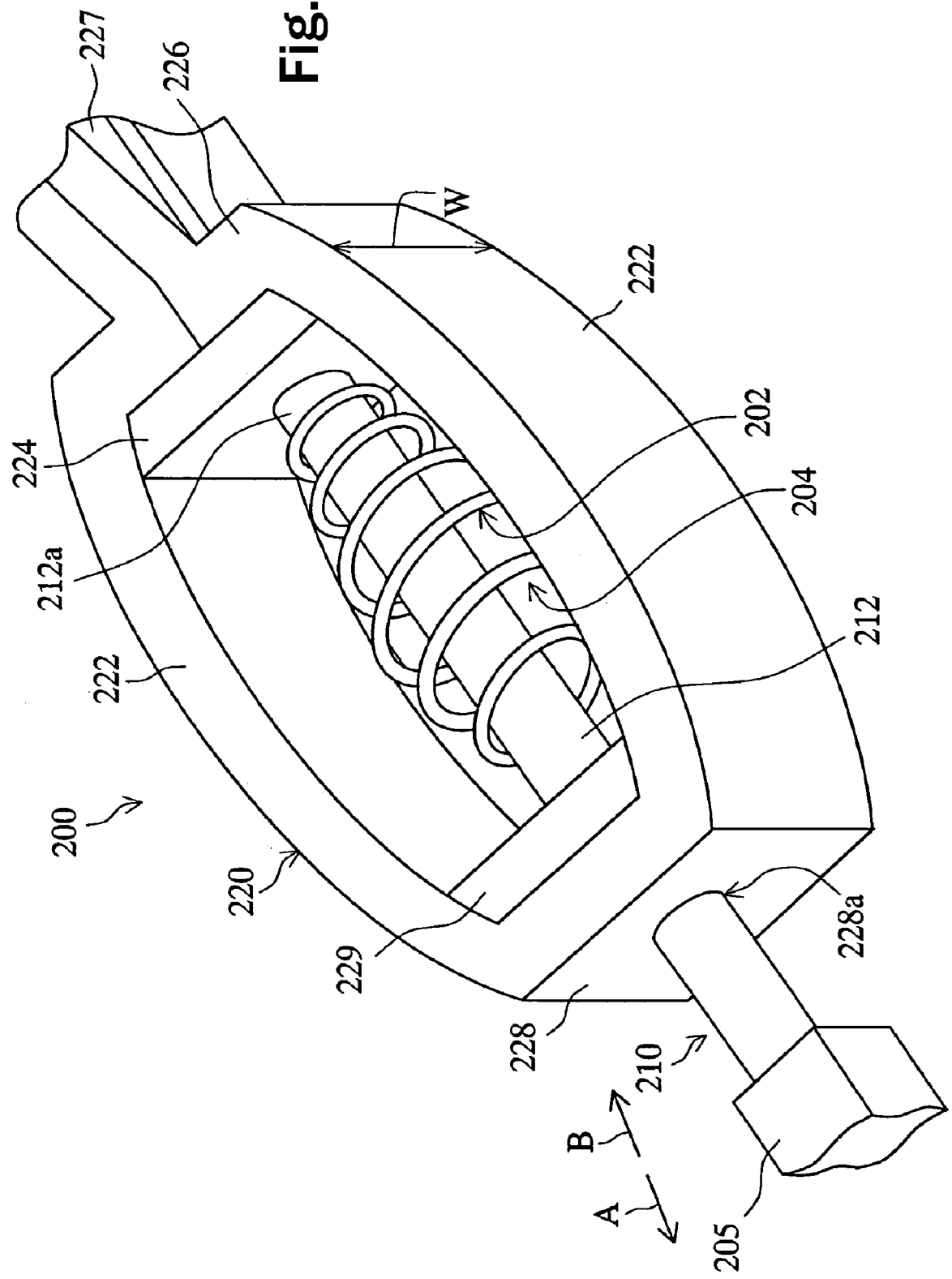
FIG. 18 is a schematic perspective view of the heat-treatment apparatus employed in Example 4.
Figure 19:
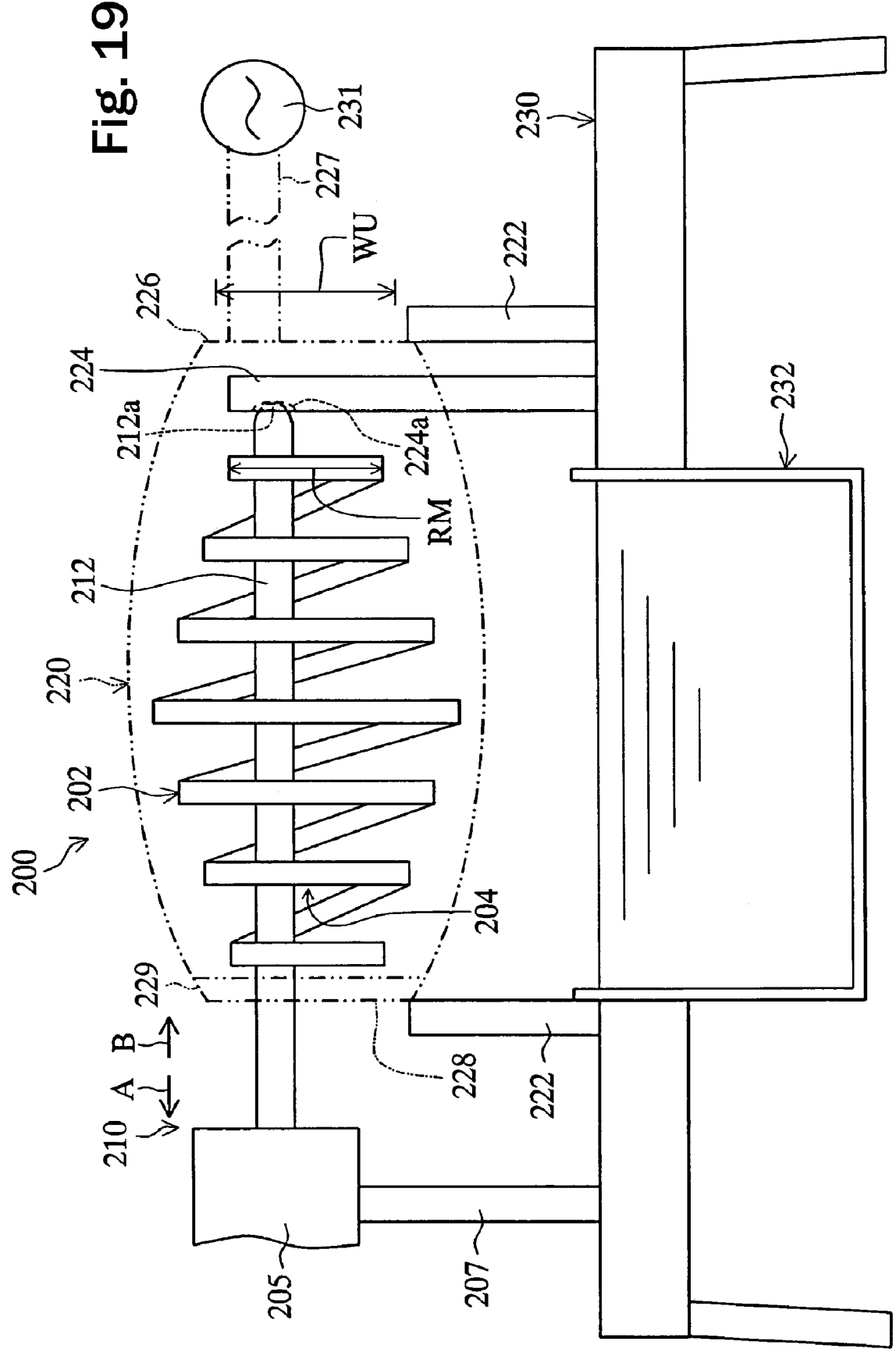
FIG. 19 is a front view of the heat-treatment apparatus shown in FIG. 18.

The induction-heating coil 220 is in a shape of barrel when viewed from the top side as shown in FIG. 18. The helix member 202 is placed inside this barrel. The induction-heating coil 220 has a pair of partial coils 222,222 counterposed with interposition of the helix member 202 supported by the supporting bar 212. The pair of partial coils 222,222 are in a shape of a plate extending along the peripheral face of the helix member 202 in the length direction, and are curved with the middle portions bulging out. The width W of the pair of partial coils 222,222 is decreased in accordance with decrease of the diameter of the helix member 202. The supporting bar 212 is placed between the pair of the partial coils 222,222 and extends parallel to the pair of the partial coils. The pair of the partial coils 222,222 have a length (height) larger than that of the helix member 202.

The induction-heating coil 220 has further an upper-side partial coil 226 corresponding to the upper side of the barrel shape, a lower-side partial coil 228 corresponding to the lower side of the barrel shape, and a connecting coil 227 for connecting the upper-side partial coil 226 to a high frequency power source 231. The width WU of the upper-side partial coil 226 is slightly larger than the minimum outside diameter RM of the upper end of the helix member 202, and the width WD of the lower-side partial coil 228 is the same. The lower-side partial coil 228 has a through-hole 228a for penetration of the supporting bar 212. Further, inside the lower-side partial coil 228, a stopper plate 229 made of a ceramic material is fixed to prevent contact of the helix member 202 with the lower-side partial coil 228.

A method is explained for quench-hardening the helix member 202 with the heat treatment apparatus 200.

Firstly the cylinder 205 is driven to move the supporting bar 212 in the arrow-A direction to allow the tip 212a of the supporting bar 212 to intrude a little into the inside of the induction-heating coil 220 (into the region surrounded by the coils 222,222,226,228). In this state, the helix member 202 is placed inside the induction-heating coil 220. Then the cylinder 205 is driven to move the supporting bar 212 in the arrow-B direction to penetrate the empty space 204 of the helix member 202, whereby the tip 212a of the supporting bar 212 is fit to a dent 224a of the supporting plate 224. Thus the helix member 202 is supported by the supporting unit 210 to be turnable by an external force or a like force.

Subsequently, a prescribed electric power is applied from a high-frequency source 231 to the induction-heating coil 220 for a prescribed time. The quantity of the power and the time of the power application depend on whether the surface layer of the helix member 202 is quench-hardened or the entire of the helix member 202 is quench-hardened (total hardening). For example, electricity is applied at a power of 80 kW, a voltage of 440 V, a frequency of 49.8 kHz, for a time of 2.5 seconds. Such a large amount of power supply in a short time from the high-frequency power source 231 to the induction-heating coil 220 induction-heats the portions 206 facing the pair of the partial coils 222,222 (portions indicated by oblique solid lines in FIG. 20) of the helix member 202 as shown in FIG. 20(a) in a short time (2.5 seconds in this example) from room temperature to a quench-hardening temperature (e.g., 900° C.).

In the course of the induction heating of the coil-facing portions 206 to the quench-hardening temperature, the coil-facing portions 206 is heated through the magnetic transformation point (770° C. in this example), and could be transformed to change from ferromagnetic to paramagnetic. However, in the practical operation, the heating is not conducted in an equilibrium state. It was found experimentally that the transformation of the coil-facing portions 206 from ferromagnetic to paramagnetic is not caused by passing the magnetic transformation point but occurs immediately after the coil-facing portions 206 have reached the quench-hardening temperature. On the other hand, unheated portions 208 of the helix member 202 other than the coil-facing portions 206 are kept ferromagnetic. Therefore, the helix member 202 is driven by the magnetic field produced by the induction-heating coil 220 to turn by an angle of 90° around the turning axis (axis parallel to the supporting bar 212 penetrating the center of cross-section of helix member 202) in the arrow-C direction (or reverse peripheral direction). As the result, as shown in FIG. 20(b), the counterposed belt zones 206 come to be placed at upper and lower positions, and unheated portions 208 come to face the pair of the partial coil 222,222. In this state also, the electric power is kept applied continuously to the induction-heating coil 220, so that the unheated portions 208 are induction-heated, following the previous coil-facing portions 206, to reach the quench-hardening temperature in 2.5 seconds.

The aforementioned cylinder 205 is controlled by a controller (not shown in the drawing) for controlling the high-frequency power source 231. This controller controls the cylinder 205 to move the supporting bar 212 in the arrow-A direction, at the time of 5.0 seconds after the start of the electric power supply from the high-frequency source 231 to the induction-heating coil 220, to a releasing position. Thereby, the helix member 202 is released to fall 5.0 seconds after the start of the induction heating of the helix member 202. At the time of 5.0 seconds after the start of the induction-heating of the helix member 202, the entire of the helix member 202 reaches the quench-hardening temperature as shown in FIG. 20(b). The helix member 202 in this state is released to fall into a cooling tank 232, whereby the entire of the helix member 202 is quenched and hardened.

As explained above, immediately after portions of the helix member 202 (coil-facing portions 206 in this example) are induction-heated up to a prescribed temperature (quench-hardening temperature), the helix member 202 is turned by a magnetic force, and successively other portions (unheated portions 208 in this example) are induction-heated, whereby the entire of the helix member 202 is uniformly induction-heated. Since the helix member 202 is turned not by a driving source like a motor, deviation of the timing of the start of turning will not be caused by electrical or mechanical error. Therefore, the prescribed portions of the helix member 202 are uniformly induction-heated and hardened.

Example 5

Example 5 of the present invention is explained by reference to FIGS. 21-23.

The heat treatment apparatus 300 is an apparatus for quenching a helix member 302 of a Japanese hand drum type (cylinder constricting toward the middle portion). The heat treatment apparatus 300 has a supporting unit 310 (an example of a supporting means in the present invention) for supporting the helix member 302 to be turnable, and an induction-heating coil 320 for induction-heating the helix member 302 supported turnably by the supporting unit 310. The induction-heating coil 320 is fixed through a ceramic pillar 322 or the like to a pedestal 330. Below the helix member 302 supported by the supporting unit 310, a cooling tank 332 is placed containing a liquid coolant.

The helix member 302 is formed by winding a wire material in a shape of a spiral of a Japanese hand drum type (cylinder constricting toward the middle portion). The helix member 302 is made of steel such as carbon steel for machine structure and spring steel. The material of the helix member 302 has a magnetic transformation point (Curie point) at 770° C. in this Example as shown in a Fe—C equilibrium diagram. At a temperature below the magnetic transformation point, the helix member 302 is ferromagnetic. The ferromagnetic helix member 302 transforms to be paramagnetic at a temperature above the magnetic transformation point.

The supporting unit 310 has a supporting bar 312 made of a ceramic material to be inserted into the empty space 304 in the helix member 302. The supporting unit 310 has also a supporting plate 324 having a dent 324a for holding the tip portion 312a of the supporting bar 312. This supporting plate 324 is made of a ceramic material, and placed and fixed inside the induction-heating coil 320. The other end of the supporting bar 312 is connected to a cylinder 305. The supporting bar 312 is moved by drive of the cylinder 305 in the arrow-A direction or the arrow-B direction. The cylinder 305 is fixed by a supporting pillar 307 to a pedestal 330.

The helix member 302 is supported by the supporting unit 310 by the operation below. The cylinder 305 is driven to move the supporting bar 312 in the arrow-A direction to allow the tip 312a thereof to intrude slightly into the inside space of the induction-heating coil 320. The helix member 302 is placed inside the induction-heating coil 320. Next, the supporting bar 312 is moved by driving the cylinder 305 in the arrow-B direction to penetrate the empty space 304 of the helix member 302 and to fit the tip 312a of the supporting bar 312 into a dent 324a of the supporting plate 324. Thereby the helix member 202 comes to be supported by the supporting unit 310 to be turnable by external force or a like force.

The position of the supporting bar 312 having been moved to the arrow-B direction for supporting the helix member 302 is called a supporting position, and the position of the supporting bar 312 having been moved in the arrow A direction for releasing the helix member 302 is called a releasing position in the present invention.

Figure 21:
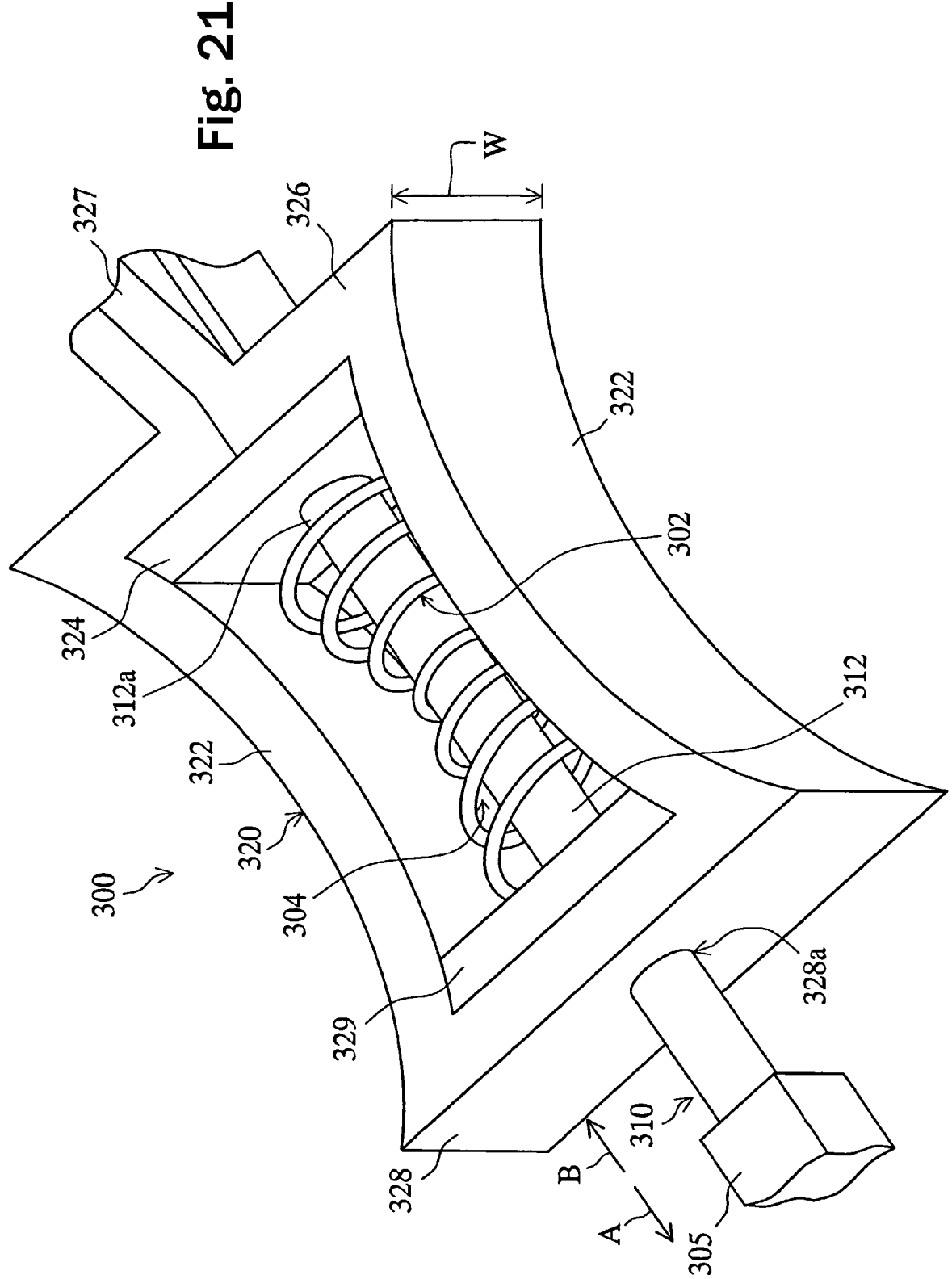
FIG. 21 is a schematic perspective view of the heat-treatment apparatus employed in Example 5.
Figure 22:
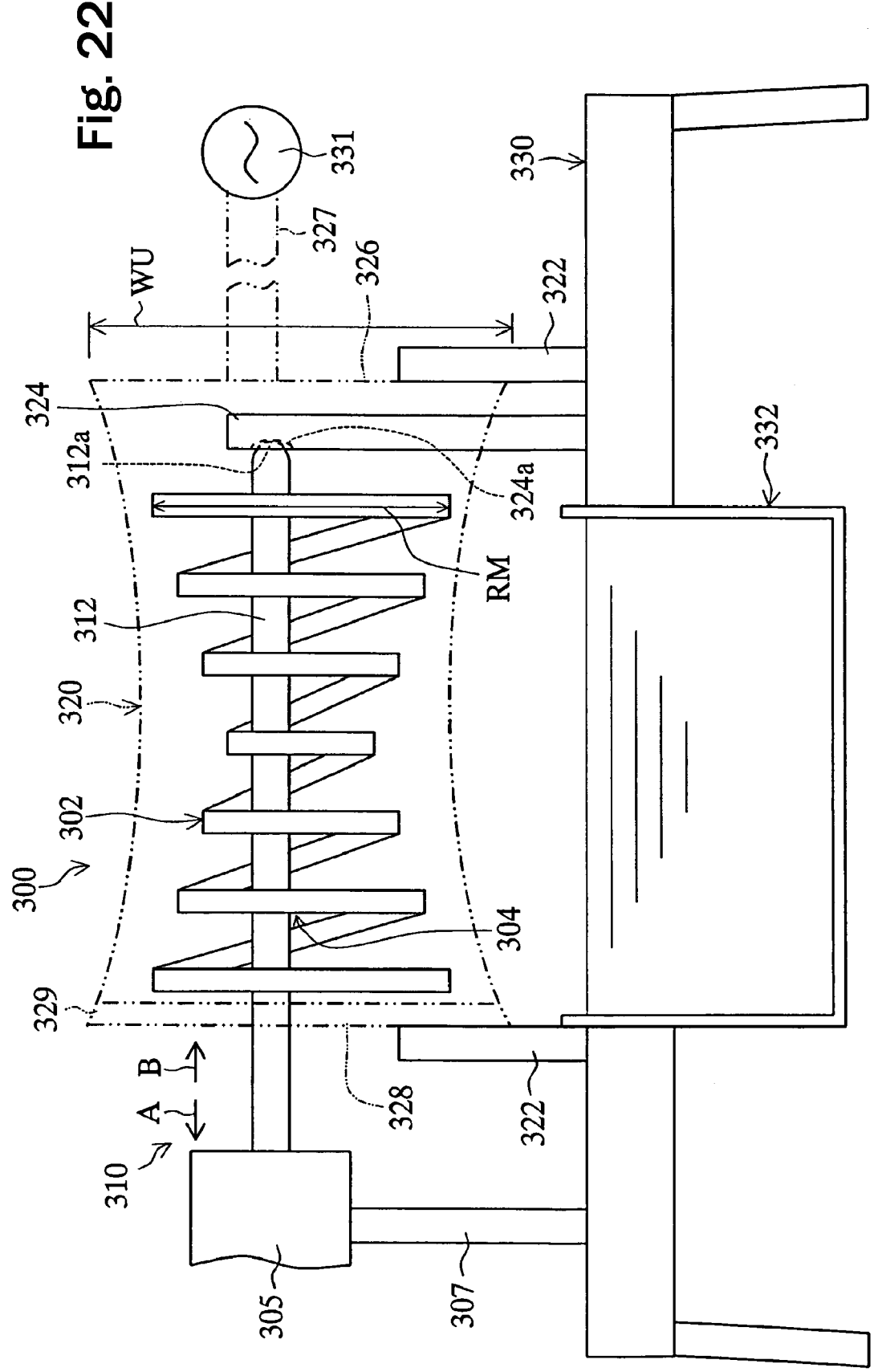
FIG. 22 is a front view of the heat-treatment apparatus shown in FIG. 21.
Figure 24:
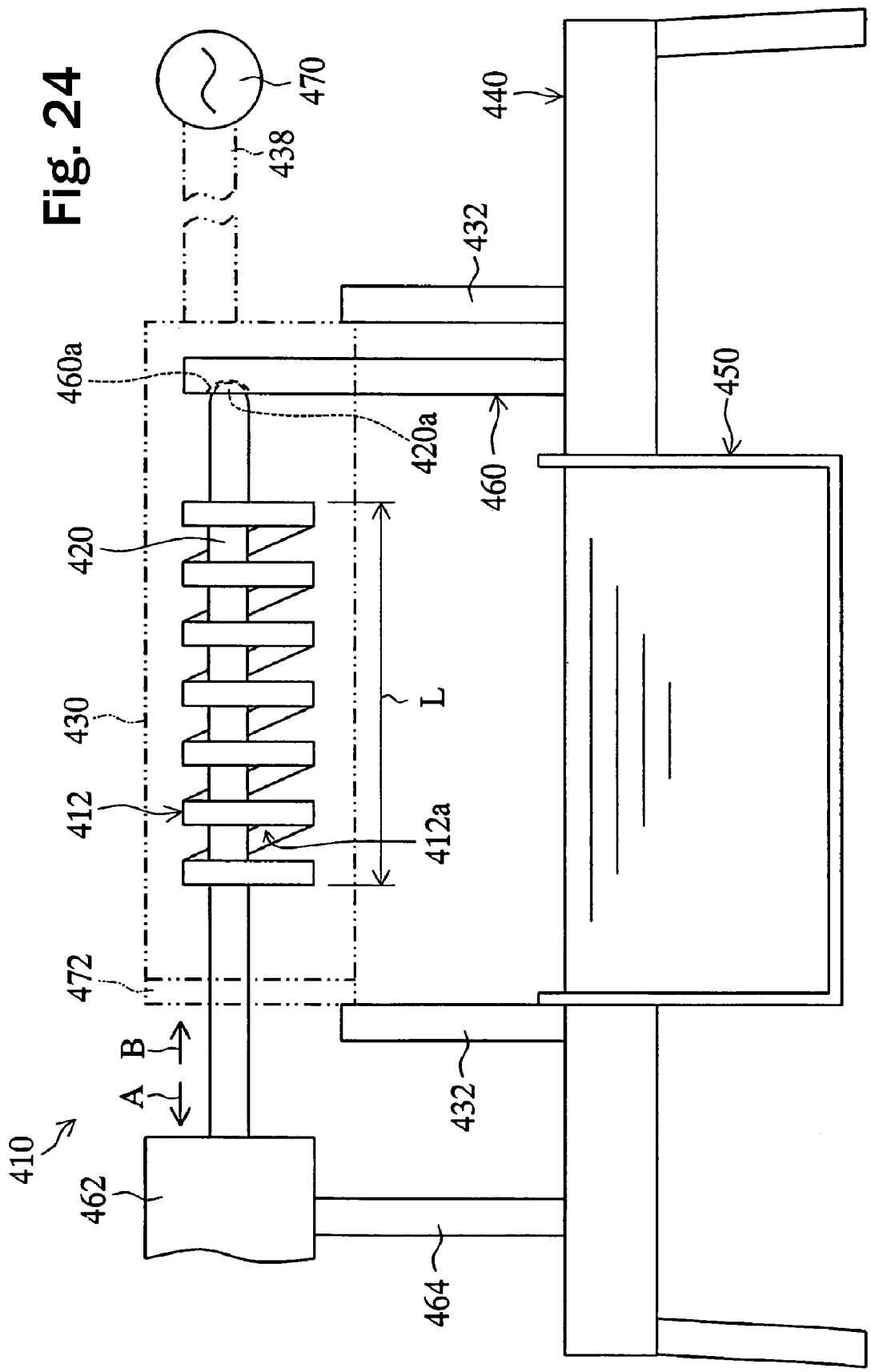
FIG. 24 is a front view of a coil spring heat-treatment apparatus of employed in Example.

The induction-heating coil 320 is in a shape of a Japanese hand drum (constricting toward the middle portion) when viewed from the top side as shown in FIG. 21. The helix member 302 is placed inside this drum-shaped space. The induction-heating coil 320 has a pair of partial coils 322,322 counterposed with interposition of the helix member 302 supported by the supporting bar 312. The pair of partial coils 322,322 are in a shape of a plate extending along the peripheral face of the helix member 302 in the length direction, and are curved with the middle portions concaved. The width W of the pair of partial coils 322,322 is decreased in accordance with decrease of the diameter of the helix member 302. The supporting bar 312 is placed between the pair of the partial coils 322,322 and extends parallel to the pair of the partial coils. The pair of the partial coils 322,322 have a length (height) larger than that of the helix member 302.

The induction-heating coil 320 has further an upper-side partial coil 326 corresponding to the upper side of the Japanese hand drum shape, a lower-side partial coil 328 corresponding to the lower side of the Japanese hand drum shape, and a connecting coil 327 for connecting the upper-side partial coil 326 to a high frequency power source 331. The width WU of the upper-side partial coil 326 is slightly larger than the maximum outside diameter RM of the upper end of the helix member 302, and the width WD of the lower-side partial coil 328 is the same. The lower-side partial coil 328 has a through-hole 328a for penetration of the supporting bar 312. Further, inside the lower-side partial coil 328, a stopper plate 329 made of a ceramic material is fixed to prevent contact of the helix member 302 with the lower-side partial coil 328.

A method is explained for quench-hardening the helix member 302 with the heat treatment apparatus 300.

Firstly the cylinder 305 is driven to move the supporting bar 312 in the arrow-A direction to allow the tip 312a of the supporting bar 312 to intrude a little into the inside of the induction-heating coil 320 (into the region surrounded by the coils 322,322,326,328). In this state, the helix member 302 is placed inside the induction-heating coil 320. Then the cylinder 304 is driven to move the supporting bar 312 in the arrow-B direction to penetrate the empty space 304 of the helix member 302, whereby the tip 312a of the supporting bar 312 is fitted into a dent 324a of the supporting plate 324. Thus the helix member 302 is supported by the supporting unit 310 to be turnable by an external force or a like force.

Subsequently, a prescribed electric power is applied from a high-frequency source 331 to the induction-heating coil 320 for a prescribed time. The quantity of the power and the time of the power application depend on whether the surface layer of the helix member 302 is quenched or the entire of the helix member 302 is quenched (total quenching). For example, electricity is applied at a power of 80 kW, a voltage of 440 V, a frequency of 49.8 kHz, for a time of 2.5 seconds. Such a large amount of power supply in a short time from the high-frequency power source 331 to the induction-heating coil 320 induction-heats the portions 306 facing the pair of the partial coils 322,322 (portions indicated by oblique solid lines in FIG. 23) of the helix member 302 as shown in FIG. 23(a) in a short time (2.5 seconds in this example) from room temperature to a quench-hardening temperature (e.g., 900° C.).

In the course of the induction heating of the counterposed belt zones 306 to the quench-hardening temperature, the counterposed belt zones 306 are heated through the magnetic transformation point (770° C. in this example), and could be transformed to change from ferromagnetic to paramagnetic. However, in the practical operation, the heating is not conducted in an equilibrium state. It was found experimentally that the transformation of the counterposed belt zones 306 from ferromagnetic to paramagnetic is not caused by passing the magnetic transformation point but occurs immediately after the counterposed belt zones 306 have reached the quench-hardening temperature. On the other hand, unheated portions 308 of the helix member 302 other than the coil-facing portions 306 are kept ferromagnetic. Therefore, the helix member 302 is driven by the magnetic field produced by the induction-heating coil 320 to turn by an angle of 90° around the turning axis (axis parallel to the supporting bar 312 penetrating the center of cross-section of helix member 302) in the arrow-C direction (or reverse peripheral direction). As the result, as shown in FIG. 23(b), the counterposed belt zones 306 come to be placed at upper and lower positions, and unheated portions 308 come to face the pair of the partial coil 322,322. In this state also, the electric power is kept applied continuously to the induction-heating coil 320, so that the unheated portions 308 are induction-heated, following the counterposed belt zones 306, to reach the quench-hardening temperature in 2.5 seconds.

The aforementioned cylinder 305 is controlled by a controller (not shown in the drawing) for controlling the high-frequency power source 331. This controller controls the cylinder 305 to move the supporting bar 312 in the arrow-A direction, at the time of 5.0 seconds after the start of the electric power supply from the high-frequency source 331 to the induction-heating coil 320, to a releasing position. Thereby, the helix member 302 is released to fall 5.0 seconds after the start of the induction heating of the helix member 302. At the time of 5.0 seconds after the start of the induction-heating of the helix member 302, the entire of the helix member 302 reaches the quench-hardening temperature as shown in FIG. 23(b). The helix member 302 in this state is released to fall into a cooling tank 332, whereby the entire of the helix member 302 is quenched and hardened.

As explained above, immediately after portions of the helix member 302 (counterposed belt zones 306 in this example) are induction-heated up to a prescribed temperature (quench-hardening temperature), the helix member 302 is turned by a magnetic force, and successively other portions (unheated counterposed belt zones 308 in this example) are induction-heated, whereby the entire of the helix member 302 is uniformly induction-heated. Since the helix member 302 is turned not by a driving source like a motor, deviation of the timing of the start of turning will not be caused by electrical or mechanical error. Therefore, the prescribed portions of the helix member 302 are uniformly induction-heated and hardened.

Example 6

Example 6 of the present invention is explained by reference to FIGS. 24-27. In this Example, a product produced by quench-hardening a coil-shaped member is called a coil spring.

A coil spring heat-treating apparatus 410 has a long narrow cylindrical supporting rod 420 made of a ceramic material for supporting turnably a coil member 412 wound in a shape of a coil, and an induction-heating coil 430 for induction-heating the coil member 412 turnably supported by the supporting rod 420. The induction-heating coil 430 is fixed through a ceramic pillar 432 or the like to a pedestal 440. Below the coil member 412 supported by the supporting rod 420, a cooling tank 450 is placed containing a liquid coolant.

The coil member 412 is produced by winding a non-quench-hardened long spring steel material in a coil state. The material of the coil member 412 has a magnetic transformation point (Curie point) at 770° C. in this Example as shown in a Fe—C equilibrium diagram. At a temperature below the magnetic transformation point, the coil member 412 is ferromagnetic. The ferromagnetic helix member 412 transforms to be paramagnetic at a temperature above the magnetic transformation point.

A ceramic supporting plate 460 made of a ceramic material is fixed inside the induction-heating coil 430 at the front side of the supporting rod 420. This supporting plate 460 has a dent 460a for holding the tip 420a of the supporting rod 420. The rear end of the supporting rod 420 is connected to a cylinder 462. The supporting rod 420 is moved by driving the cylinder 462 in the arrow-A direction or the arrow-B direction. The cylinder 462 is fixed by a supporting pillar 464 to a pedestal 440.

The coil member 412 is supported by the supporting rod 420 by the following operation. The cylinder 462 is driven to move the supporting rod 420 in the arrow-A direction to allow the tip 420a thereof to intrude slightly into the inside space of the induction-heating coil 430 as shown in FIG. 26(a). The coil member 412 is placed inside the induction-heating coil 430. Next, the supporting rod 420 is moved by driving the cylinder 462 in the arrow-B direction to penetrate the empty space 412a of the helix member 412 and to fit the tip 420a of the supporting rod 420 into a dent 460a of the supporting plate 460 as shown in FIG. 26(b). Thereby the coil member 412 comes to be supported by the supporting rod 420 to be turnable by external force or a like force.

The position of the supporting rod 420 having been moved to the arrow-B direction for supporting the coil member 412 is called a supporting position, and the position of the supporting rod 420 having been moved in the arrow A direction for releasing the coil member 412 is called a releasing position in the present invention.

Figure 25:
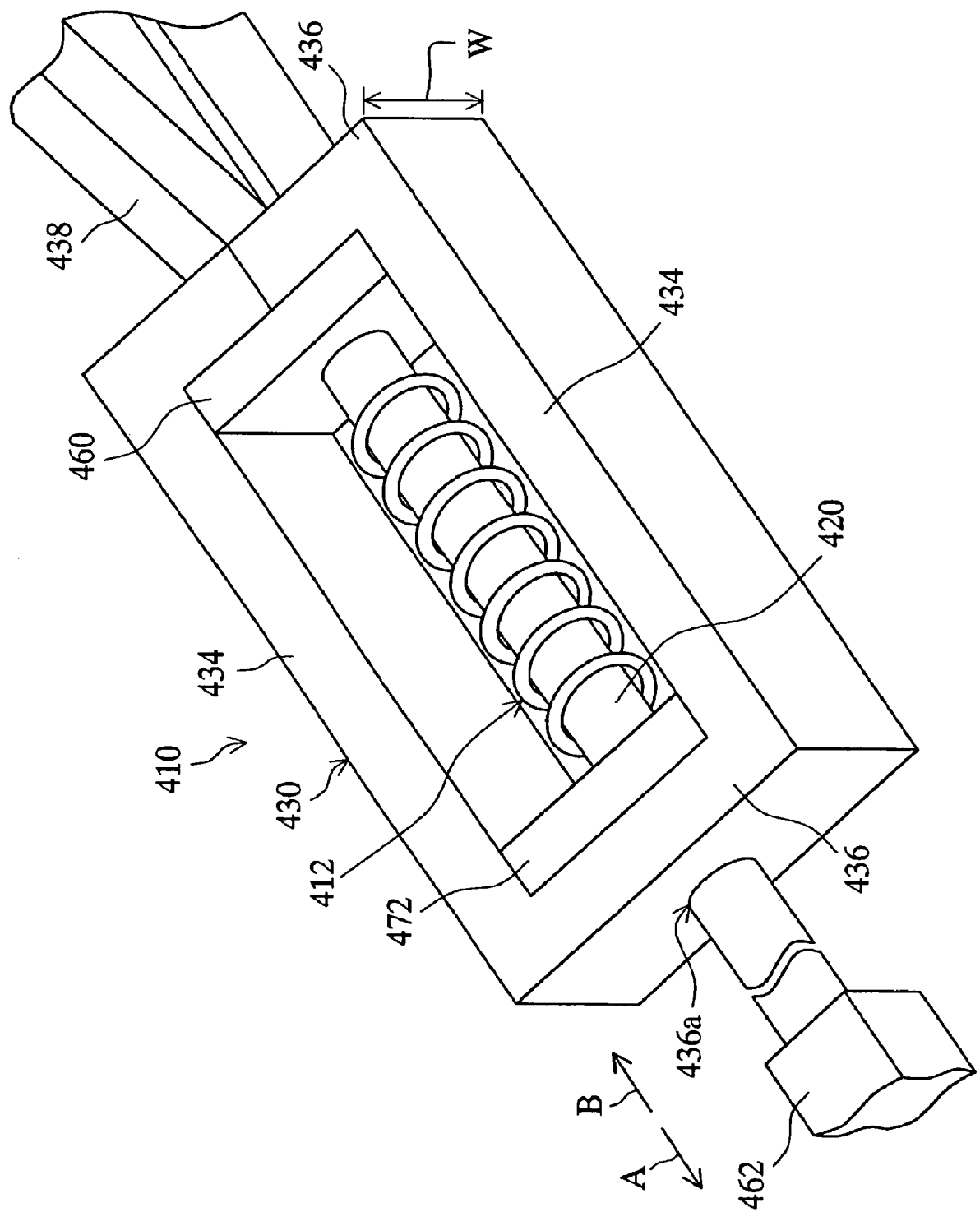
FIG. 25 is a schematic perspective view of an induction-heating coil of the coil spring heat-treatment apparatus of FIG. 24.

The induction-heating coil 430 is in a shape of a rectangle as shown in FIG. 25. The coil member 412 is placed inside this rectangle. The induction-heating coil 430 has a pair of long-side partial coils 434,434, corresponding to the long sides of the rectangle; short-side partial coils 436,436 corresponding to the short sides of the rectangle; and connecting coil 438 for connecting one short-side partial coil to a high-frequency power source 470. The length of the long-side partial coil 434,434 is larger than the length L of the coil member 412 (FIG. 24), and the length of the short-side partial coils 436,436 is larger than the diameter R of the coil member 412 (FIG. 27). The width W of the long-side partial coils 434,434 and the short-side partial coils 436,436 is larger than the diameter R of the coil member 412. Of the pair of the short-side partial coils 436,436, the one not connected to the connecting coil 438 has a through-hole 436a for penetration of the supporting rod 420. Inside of this short-side partial coil 436, a stopper plate 472 made of a ceramic material is fixed to prevent contact of the coil member 412 with the short-side partial coil 436.

The pair of the long-side partial coils 434,434 are placed in opposition with interposition of the coil member 412, and extend in the direction parallel to the length direction (in the direction of the arrow-A and arrow-B direction) of the coil member 412 (a parallel placement in the present invention). Therefore, the long-side partial coils 434,434 face to the counterposed portions of the coil member 412 extending in parallel to the supporting rod 420.

A method is explained for quench-hardening the coil member 412 with the heat treatment apparatus 410.

Firstly the cylinder 462 is driven to move the supporting rod 420 in the arrow-A direction to allow the tip 420a of the supporting rod 420 to intrude a little into the inside of the induction-heating coil 430 as shown in FIG. 26(a). In this state, the coil member 412 is placed inside the induction-heating coil 430. Then the cylinder 462 is driven to move the supporting rod 420 in the arrow-B direction to penetrate the empty space 412a of the coil member 412, whereby the tip 420a of the supporting rod 420 is fitted into a dent 460a of the supporting plate 460 as shown in FIG. 26(b). Thus the coil member 412 is supported by the supporting rod 420 to be turnable by an external force or a like force.

Subsequently, a prescribed electric power is applied from a high-frequency source 470 to the induction-heating coil 430 for a prescribed time. The quantity of the power and the time of the power application depend on whether the surface layer of the coil member 412 is quench-hardened or the entire of the coil member 412 is quench-hardened (total hardening). For example, electricity is applied at a power of 80 kW, a voltage of 440 V, a frequency of 49.8 kHz, for a time of 2.5 seconds. Such a large amount of power supply in a short time from the high-frequency power source 470 to the induction-heating coil 430 induction-heats the portions 414 (portions indicated by oblique solid lines in FIG. 27) facing the pair of the long-side partial coils 434,434 of the coil member 412 as shown in FIG. 27(a) in a short time (2.5 seconds in this example) from room temperature to a quench-hardening temperature (e.g., 900° C.).

In the course of the induction heating of the counterposed portions 414 to the quench-hardening temperature, the counterposed portions 414 are heated through the magnetic transformation point (770° C. in this example), and could be transformed to change from ferromagnetic to paramagnetic. However, in the practical operation, the heating is not conducted in an equilibrium state. It was found experimentally that the transformation of the counterposed portions 414 from ferromagnetic to paramagnetic is not caused by passing the magnetic transformation point but occurs immediately after the counterposed portions 414 have reached the quench-hardening temperature. On the other hand, unheated portions 416 of the coil member 412 other than the counterposed portions 414 are kept ferromagnetic. Therefore, the coil member 412 is driven by the magnetic field produced by the long-side partial coils 434,434 to turn by an angle of 90° around the turning axis (axis parallel to the supporting rod 420 penetrating the center of cross-section of the coil member 412) in the arrow-C direction (or reverse peripheral direction). As the result, as shown in FIG. 27(b), the counterposed portions 414 comes to be placed at upper and lower positions, and unheated portions 416 come to face the pair of the long-side partial coil 434,434. In this state also, the electric power is kept applied continuously to the induction-heating coil 430, so that the unheated portions 416 are induction-heated, following the counterposed portions 414, to reach the quench-hardening temperature in 2.5 seconds.

The aforementioned cylinder 462 is controlled by a controller (not shown in the drawing) for controlling the high-frequency power source 470. This controller controls the cylinder 462 to move the supporting rod 420 in the arrow-A direction, at the time of 5.0 seconds after the start of the electric power supply from the high-frequency source 470 to the induction-heating coil 430, to a releasing position. Thereby, the coil member 412 is released to fall 5.0 seconds after the start of the induction heating of the coil member 412. Therefore, at the time of 5.0 seconds after the start of the induction-heating of the coil member 412, the entire of the coil member 412 reaches the quench-hardening temperature as shown in FIG. 27(b), and the coil member 412 in this state is released to fall into a cooling tank 450, whereby the entire of the coil member 412 is quenched and hardened to produce a high-quality coil spring.

As explained above, immediately after portions of the coil member 412 (counterposed portions 414 in this example) are induction-heated up to a prescribed temperature (quench-hardening temperature), the coil member 412 is turned by a magnetic force, and successively other portions (unheated portions 416 in this example) are induction-heated, whereby the entire of the coil member 412 is uniformly induction-heated. Then immediately, the supporting rod 420 is moved from the supporting position to the releasing position to allow the coil member 412 to fall into a cooling tank 450 for quenching. In such a manner, the coil member 412 is uniformly induction-heated to a quench-hardening temperature and hardened in a short time, whereby a coil spring can be produced with uniform metal structure and uniform hardness at a low cost. Since the time for induction-heating of the coil member 412 is as short as 5.0 seconds or less, overheating is not caused, whether the coil member 412 is of a closed type or of an open type, at the end portions in the length direction, enabling heat treatment of a coil spring such as high-quality valve springs without coarsening of crystal grains.

In the above Example, the coil member 412 is induction-heated for 5.0 seconds. However the time of the heating can be shortened further by increasing the electric power supplied to the induction-heating coil 430. By shortening the induction-heating time to be less than 5.0 seconds, the overheating can be more surely prevented at the lengthwise ends of the coil member 412.

Plural coil members 412 can be quench-hardened at one time by lengthening the supporting rod 420 to support the plural coil members 412. The simultaneous quenching of plural coil members 412 at one time can lower the cost of the heat treatment. The present invention is applicable not only to quenching a coil spring but also to quenching other type of coil-shaped steel members. The present invention is applicable to quench-hardening of coiled steel members as well as the coil spring.

INDUSTRIAL APPLICABILITY

In the first heat-treatment apparatus of the present invention, a belt zone of a workpiece extending parallel to the turning axis of the workpiece supported by a supporting means is induction-heated by an induction-heating coil. In the case where the workpiece is made of a material which will be transformed from a ferromagnetic state to a paramagnetic state by heating to a temperature above the magnetic transformation point thereof, the heated belt zone of the workpiece is transformed from ferromagnetic to paramagnetic by induction-heating to a temperature above the magnetic transformation point. On the other hand, the portion other than the heated belt zone (an unheated portion) of the workpiece, which is heated only a little, is kept ferromagnetic at a temperature below the magnetic transformation point, even when the above belt zone has been brought to a temperature above the magnetic transformation point. Therefore, the unheated portion is attracted toward the induction-heating coil by the magnetic field generated by the induction-heating coil. Consequently, the workpiece turns spontaneously without a driving motor or a like driving means. In such a manner, the unheated portion is successively induction-heated following the belt zone to result in uniform heating of the entire of the zones parallel to the turning axis of the workpiece. In contrast, in the case where the workpiece is turned forcibly by a jig or a like means, the jig can deform the workpiece by contacting and supporting the workpiece at a high contact pressure. In the present invention, however, the workpiece is not deformed since the workpiece turns spontaneously under the action of the magnetic force.

In the second heat-treatment apparatus of the present invention, a belt zone of a workpiece extending parallel to turning axis of the workpiece supported by a supporting means is induction-heated by an induction-heating coil placed in opposition to the belt zone. In the case where the workpiece is made of a material which will be transformed from a ferromagnetic state to a paramagnetic state by heating to a temperature above the magnetic transformation point thereof, the belt zone of the workpiece is transformed from ferromagnetic to paramagnetic by induction-heating to a temperature above the magnetic transformation point. On the other hand, the portion other than the heated belt zone (an unheated portion), which does not face the induction coil, of the workpiece is heated only a little, and is kept ferromagnetic at a temperature below the magnetic transformation point, even when the above belt zone has been brought to a temperature above the magnetic transformation point. Therefore, the unheated portion is attracted toward the induction-heating coil by the magnetic field generated by the induction-heating coil. Consequently, the workpiece turns spontaneously without a driving motor or a like driving means, and the unheated portion is induction-heated. In such a manner, the unheated portion is successively induction-heated following the belt zone to result in uniform heating of the entire of the zones parallel to the turning axis of the workpiece. In contrast, in the case where the workpiece is turned forcibly by a jig or a like means, the jig can deform the workpiece by contacting and supporting the workpiece at a high contact pressure. In the present invention, however, the workpiece is not deformed since the workpiece turns spontaneously under the action of the magnetic force.

In the third heat-treatment apparatus of the present invention, a belt zone of the peripheral face of a columnar workpiece extending parallel to turning axis of the workpiece supported by a supporting means is induction-heated by an induction-heating coil placed in opposition to the belt zone. In the case where the workpiece is made of a material which will be transformed from a ferromagnetic state to a paramagnetic state by the induction-heating to a temperature above the magnetic transformation point thereof, the belt zone of the workpiece is transformed from ferromagnetic to paramagnetic by induction-heating to a temperature above the magnetic transformation point. On the other hand, the portion other than the heated belt zone (an unheated portion), which does not face the induction coil, of the workpiece, is heated only a little, and is kept ferromagnetic at a temperature below the magnetic transformation point, even when the above belt zone has been brought to a temperature above the magnetic transformation point. Therefore, the unheated portion is attracted toward the induction-heating coil by the magnetic force of the magnetic field generated by the induction-heating coil. Consequently, the workpiece turns spontaneously without a driving motor or a like driving means, and the unheated portion is induction-heated. In such a manner the unheated portion is successively induction-heated following the belt zone to result in uniform heating of the entire of the zones parallel to the turning axis of the workpiece. In contrast, in the case where the columnar workpiece is turned forcibly by a jig or a like means, the jig can deform the columnar workpiece by contacting and supporting the columnar workpiece at a high contact pressure. In the present invention, however, the columnar workpiece is not deformed since the columnar workpiece turns spontaneously under the action of the magnetic force.

In the fourth heat-treatment apparatus of the present invention, a belt zone of a tubular workpiece supported by a supporting means is induction-heated by an induction-heating coil placed in opposition to the belt zone. In the case where the workpiece is made of a material which will be transformed from a ferromagnetic state to a paramagnetic state by heating to a temperature above the magnetic transformation point thereof, the belt zone of the workpiece is transformed from ferromagnetic to paramagnetic by induction-heating to a temperature above the magnetic transformation point. On the other hand, the portion other than the heated belt zone (an unheated portion), which does not face the induction coil, of the peripheral face of the workpiece is heated only a little, and is kept ferromagnetic at a temperature below the magnetic transformation point, even when the above belt zone has been heated to a temperature above the magnetic transformation point. Therefore, the unheated portion is attracted toward the induction-heating coil by the magnetic field generated by the induction-heating coil. Consequently, the workpiece turns spontaneously without a driving motor or a like driving means, and the unheated portion is induction-heated. In such a manner, the unheated portion is successively induction-heated following the belt zone to result in uniform heating of the entire of the zones parallel to the supporting means for the workpiece. In contrast, in the case where the tubular workpiece is turned forcibly by a jig or a like means, the jig can deform the tubular workpiece by contacting and supporting the tubular workpiece at a high contact pressure. In the present invention, however, the tubular workpiece is not deformed since the tubular workpiece turns spontaneously under the action of the magnetic force.

In the fifth heat-treatment apparatus of the present invention, a portion of a peripheral face of a helix member supported by a supporting rod is induction-heated by an induction-heating coil placed in opposition to the portion of the peripheral face. When induction-heated to a temperature above the magnetic transformation point, the portion of the helix member opposing the induction-heating coil is transformed from ferromagnetic to paramagnetic by heating. On the other hand, the portion other than the opposing portion (an unheated portion) of the peripheral face of the helix member, which is heated only a little, is kept ferromagnetic and at a temperature below the magnetic transformation point, even when the above opposing portion is brought to a temperature above the magnetic transformation point. Therefore, the unheated portion is attracted toward the induction-heating coil by the magnetic field generated by the induction-heating coil. Consequently, the helix member turns spontaneously without a driving motor or a like driving means, and the unheated portion is induction-heated. In such a manner the unheated portion is successively induction-heated following the opposing portion to result in uniform heating of the entire of the helix member along the turning direction. In contrast, in the case where the helix member is turned forcibly by a jig or a like means, the jig can deform the helix member by contacting and supporting the helix member at a high contact pressure. In the present invention, however, the helix member is not deformed since the helix member turns spontaneously under the action of the magnetic force.

In the first heat-treatment method for induction-heating a workpiece of the present invention, a belt zone of a workpiece extending parallel to turning axis of the workpiece supported turnably is induction-heated. In the case where the workpiece is made of a material which will be transformed from a ferromagnetic state to a paramagnetic state by heating to a temperature above the magnetic transformation point thereof, when the belt zone of the workpiece has been heated to a temperature above the magnetic transformation point, the portion other than the above belt zone is attracted by the magnetic field toward the induction-heating coil. Consequently, the workpiece turns spontaneously without a driving motor or a like driving means, and the portion other than the belt zone is induction-heated. In such a manner, other portion is successively induction heated near the induction heating coil following the heated belt zone to result in uniform heating of the entire of the zones parallel to the turning axis of the workpiece. In contrast, in the case where the workpiece is turned forcibly by a jig or a like means, the jig can deform the workpiece by contacting and supporting the workpiece at a high contact pressure. In the present invention, however, the workpiece is not deformed since the workpiece turns spontaneously under the action of the magnetic force.

In the second heat-treatment method for induction-heating a columnar workpiece of the present invention, a belt zone extending parallel to a rod-shaped supporting means for supporting the columnar workpiece supported turnably is induction-heated. In the case where the columnar workpiece is made of a material which will be transformed from a ferromagnetic state to a paramagnetic state by heating to a temperature above the magnetic transformation point thereof, when the belt zone of the columnar workpiece has been heated to a temperature above the magnetic transformation point, the portion other than the above belt zone is attracted by the magnetic field toward the induction-heating coil. Consequently, the workpiece turns spontaneously without a driving motor or a like means, and the portion other than the belt zone is induction-heated near the induction-heating coil. In such a manner, other portion is successively induction heated near the induction heating coil following the heated belt zone to result in uniform heating of the entire of the zones parallel to the turning axis of the columnar workpiece. In contrast, in the case where the columnar workpiece is turned forcibly by a jig or a like means, the jig can deform the columnar workplace by contacting and supporting the columnar workpiece at a high contact pressure. In the present invention, however, the columnar workpiece is not deformed since the columnar workpiece turns spontaneously under the action of the magnetic force.

According to the third heat treatment method of the present invention, a tubular work-piece can be induction-heated entirely uniformly. When the tubular workpiece is turned forcibly by a jig or a like means, the jig can deform the tubular workpiece by contacting and supporting the tubular workpiece at a high contact pressure. In the present invention, however, the tubular workpiece is not deformed since the tubular workpiece turns spontaneously under the action of the magnetic force.

According to the fourth heat treatment method of the present invention, a helix member can be induction-heated entirely uniformly. When the helix member is turned forcibly by a jig or a like means, the jig can deform the helix member by contacting and supporting the helix member at a high contact pressure. In the present invention, however, the helix member is not deformed since the helix member turns spontaneously under the action of the magnetic force.

According to the method of heat treatment of a coil spring and the apparatus for heat treatment of a coil spring, a long side of a rectangular induction-heating coil is opposed to a coil-shaped member supported by a supporting rod to induction-heat a portion of the coil-shaped member (opposing portion) opposing the long side. This opposing portion corresponds to about one-fourth portion of the outside periphery of the coil-shaped member and another one-fourth portion on the reverse side thereof. By the induction-heating, when the temperature of the opposing portion is heated to a temperature above the magnetic transformation point, the opposing portion is changed from ferromagnetic to paramagnetic. On the other hand, the portion other than the opposing portions (unheated portions) of the peripheral face of the coil-shaped member, which is not opposed to the induction-heating coil and is heated only a little, is kept ferromagnetic at a temperature below the magnetic transformation point, even when the above opposing portion zone has been brought to a temperature above the magnetic transformation point. Therefore, the unheated portion is attracted toward the induction-heating coil by the magnetic field generated by the induction-heating coil. Consequently, the coil-shaped member turns spontaneously and the unheated portion is induction-heated by the induction heating coil. In such a manner the unheated portion is successively induction-heated after the opposing portion to result in uniform heating of the entire of the coil-shaped member along the turning direction. After the induction heating, the supporting rod is moved from the supporting position to the releasing position to allow the coil-shaped member fall into a cooling tank for quenching. In such a manner, the coil-shaped member is induction-heated uniformly to the hardening temperature for quench-hardening temperature to produce a coil spring having a uniform metal structure and uniform hardness at a lower production cost. The method and apparatus of heat treatment of a coil spring of the present invention are especially effective for heat treatment of small-sized coil springs such as valve springs.

The invention claimed is:

1. A heat treatment method for a workpiece, comprising supporting the workpiece turnably around a turning axis, induction-heating a belt zone, extending parallel to the turning axis, of the workpiece by bringing an induction-heating coil near to the belt zone,
   allowing the workpiece to turn by a magnetic force, when the belt zone has been heated above a predetermined temperature, to bring another portion other than the belt zone near to the induction coil, and
   induction-heating the portion.

2. A heat treatment method for a columnar workpiece, comprising supporting the columnar workpiece turnably in a periphery direction,
   induction-heating a belt zone, extending in a height direction, of the columnar workpiece by bringing an induction-heating coil near to the belt zone,
   allowing the columnar workpiece to turn by a magnetic force, when the belt zone has been heated above a predetermined temperature, to bring another portion other than the belt zone near to the induction coil, and
   induction-heating the portion.

3. A heat treatment method for a tubular workpiece, comprising supporting the tubular workpiece to be turnable in a periphery direction of the tubular workpiece by a rod-shaped supporting means inserted into a hollow of the workpiece, induction-heating a belt zone, extending parallel to the supporting means, of the peripheral face of the tubular workpiece by bringing an induction-heating coil near to the belt zone,
   allowing the tubular workpiece to turn by a magnetic force, when the belt zone has been heated above a predetermined temperature to bring a portion other than the belt zone near to the induction coil, and
   induction-heating the portion.

4. A heat treatment method for a helix member, comprising supporting the helix member turnably in a direction of the periphery thereof by a ceramic supporting rod inserted into a hollow of the helix member formed from a material which is transformed from ferromagnetic to paramagnetic by temperature elevation above the magnetic transformation point,
   induction-heating opposed portions of the peripheral face of the helix member, supported by the supporting rod on the both sides of the supporting rod, by bringing an induction-heating coil near to the opposed portions,
   allowing the helix member to turn by a magnetic force, when the belt zone has been heated above a predetermined temperature, to bring portions other than the opposed portions near to the induction coil, and
   induction-heating the portions.

5. The heat treatment method according to claim 4, wherein the helix member is allowed to fall, when the helix member has heated up to a predetermined hardening temperature, into a cooling tank containing a coolant by pulling the supporting rod out of the hollow portion of the helix member.

6. A heat treatment method for a coil spring, comprising supporting the coil spring turnably in a direction of the periphery thereof by a ceramic supporting rod inserted into a hollow of the coil spring formed from a material which is transformed from ferromagnetic to paramagnetic by temperature elevation above the magnetic transformation point,
   induction-heating opposed portions of the peripheral face of the coil spring, supported by the supporting rod on the both sides of the supporting rod, by bringing an induction-heating coil near to the opposed portions,
   allowing the coil spring to turn by a magnetic force, when the belt zone has been heated above a predetermined temperature, to bring portions other than the opposed portions near to the induction coil, and
   induction-heating the portions.

7. The heat treatment according to claim 6, wherein the coil spring is allowed to fall, when the coil spring has heated up to a predetermined hardening temperature, into a cooling tank containing a coolant by pulling the supporting rod out of the hollow portion of the coil spring.

* * * * *